United States Patent
Matsumoto et al.

(10) Patent No.: US 10,737,726 B2
(45) Date of Patent: Aug. 11, 2020

(54) DISPLAY CONTROL DEVICE, DISPLAY CONTROL SYSTEM, DISPLAY CONTROL METHOD, AND DISPLAY CONTROL PROGRAM

(71) Applicant: JVCKENWOOD Corporation, Yokohama-shi, Kanagawa (JP)

(72) Inventors: Hideyuki Matsumoto, Yokohama (JP); Mitsugu Oba, Yokohama (JP); Fumio Tsukamoto, Yokohama (JP); Ichiro Ishida, Yokohama (JP); Tetsu Yamada, Yokohama (JP)

(73) Assignee: JVCKENWOOD Corporation, Yokohama-shi (JP)

(*) Notice: Subject to any disclaimer, the term of this patent is extended or adjusted under 35 U.S.C. 154(b) by 0 days.

(21) Appl. No.: 16/714,508

(22) Filed: Dec. 13, 2019

(65) Prior Publication Data
US 2020/0118310 A1 Apr. 16, 2020

Related U.S. Application Data

(63) Continuation of application No. PCT/JP2018/000367, filed on Jan. 10, 2018.

(30) Foreign Application Priority Data

Jun. 16, 2017 (JP) .................... 2017-118401
Jun. 16, 2017 (JP) .................... 2017-118402

(51) Int. Cl.
*B62D 15/02* (2006.01)
*G06T 11/20* (2006.01)
(Continued)

(52) U.S. Cl.
CPC ............ *B62D 15/0295* (2013.01); *B60R 1/00* (2013.01); *B62D 15/028* (2013.01);
(Continued)

(58) Field of Classification Search
None
See application file for complete search history.

(56) References Cited

U.S. PATENT DOCUMENTS

2001/0026317 A1* 10/2001 Kakinami ............. B60Q 9/005
348/148
2007/0021881 A1* 1/2007 Mori ..................... B60Q 9/005
701/28
(Continued)

FOREIGN PATENT DOCUMENTS

JP 2008132882 A 6/2008
JP 2008162426 A 7/2008
(Continued)

*Primary Examiner* — Jwalant Amin
(74) *Attorney, Agent, or Firm* — Procopio, Cory, Hargreaves & Savitch LLP

(57) ABSTRACT

A display control device includes a video data acquisition unit that acquires video data from a camera that captures a video image in a moving direction of a vehicle, a vehicle motion detection unit that detects motion information containing a steering angle of the vehicle, an expected path line generation unit that generates a main expected path line extending along a planned moving path in accordance with the steering angle from a center part of a width of the vehicle, a superimposed video generation unit that generates superimposed data, the superimposed data being video data where the main expected path line is superimposed on the video data, and a display control unit that transmits the superimposed data to a display unit so as to display a video related to the superimposed data on the display unit.

13 Claims, 23 Drawing Sheets

(51) Int. Cl.
*G06T 7/20* (2017.01)
*G06K 9/00* (2006.01)
*B60R 1/00* (2006.01)
*G08G 1/16* (2006.01)

(52) U.S. Cl.
CPC ..... *B62D 15/0275* (2013.01); *G06K 9/00671* (2013.01); *G06K 9/00805* (2013.01); *G06T 7/20* (2013.01); *G06T 11/203* (2013.01); *G08G 1/168* (2013.01); *B60R 2300/301* (2013.01); *B60R 2300/305* (2013.01); *B60R 2300/806* (2013.01); *B60R 2300/8086* (2013.01); *G06K 9/00798* (2013.01); *G06T 2207/10016* (2013.01); *G06T 2207/30256* (2013.01); *G06T 2207/30261* (2013.01)

(56) References Cited

U.S. PATENT DOCUMENTS

| | | |
|---|---|---|
| 2008/0158011 A1 | 7/2008 | Yamanaka |
| 2009/0303080 A1 | 12/2009 | Kadowaki et al. |
| 2010/0066825 A1* | 3/2010 | Kuboyama ........ B62D 15/0275 348/118 |
| 2012/0296523 A1* | 11/2012 | Ikeda ................ B62D 15/0275 701/41 |
| 2015/0057870 A1* | 2/2015 | Lee ...................... B60W 30/06 701/23 |
| 2016/0094807 A1* | 3/2016 | Fujio ..................... H04N 7/183 348/148 |
| 2016/0114795 A1* | 4/2016 | Kiyokawa ............ G01S 15/931 342/55 |
| 2017/0132482 A1* | 5/2017 | Kim ...................... B60K 35/00 |
| 2017/0137061 A1* | 5/2017 | Azuma ................ B62D 15/021 |
| 2019/0084618 A1* | 3/2019 | Numata ............. B62D 15/0275 |
| 2019/0096261 A1* | 3/2019 | Hayashi ................ B60W 30/06 |

FOREIGN PATENT DOCUMENTS

| | | |
|---|---|---|
| JP | 2009292339 A | 12/2009 |
| JP | 2011046262 A | 3/2011 |
| JP | 2011211432 A | 10/2011 |
| JP | 2012090087 A | 5/2012 |
| JP | 2013184612 A | 9/2013 |

* cited by examiner

DISPLAY CONTROL DEVICE, DISPLAY CONTROL SYSTEM, DISPLAY CONTROL METHOD, AND DISPLAY CONTROL PROGRAM

CROSS REFERENCE TO RELATED APPLICATION

The present application is a Bypass continuation of PCT/JP2018/000367 filed on Jan. 10, 2018, which is based upon and claims the benefit of priority from Japanese Patent Application No. 2017-118402, filed on Jun. 16, 2017, and Japanese Patent Application No. 2017-118401, filed on Jun. 16, 2017, the disclosure of which are incorporated herein in its entirety by reference.

BACKGROUND

The present invention relates to a display control device, a display control system, a display control method, and a display control program.

A technique that, when a vehicle is moving backward, superimposes a guide line indicating a predicted path of backward motion on a rearward video image captured using a rear camera mounted at the back of the vehicle and displays this video image on a display unit such as a monitor to easily and accurately guide the vehicle to a parking space has become popular recently.

For example, the vehicle-mounted imaging device disclosed in Japanese Unexamined Patent Application Publication No. 2011-211432 takes a video showing the back of a vehicle at the time of parking the vehicle, for example, and displays the video image showing the back of the vehicle on an in-vehicle monitor, and further superimposes a predicted path in the moving direction of the vehicle on this video image showing the back of the vehicle.

SUMMARY

FIG. 24 shows an example of the related art according to Patent Literature 1. A video image 40 shown in this example is a video image captured using a rear camera mounted at the back of a vehicle, on which a guide line 70 indicating a predicted path of the vehicle's backward motion is superimposed. A driver is moving a vehicle 10 to a parking space 33 that includes parking lines 30 and 31. The guide line 70 corresponds to the width of the vehicle 10 and is drawn along an intended path of the vehicle. The parking line 30 and the guide line 70 overlap.

As described above, in the related art, a guide line superimposed on a rearward video image overlaps a parking line in some cases. In such cases, it is difficult for a driver to find out the parking line in the displayed video image. Thus, there are cases where it is difficult for a driver to grasp the positional relationship between a vehicle and a parking space.

The present embodiment has been accomplished to solve the above problems and an object of the present invention is thus to provide a display control device, a display control system, a display control method, and a display control program that reduce difficulty of visually recognizing a parking line displayed on a display unit.

A display control device according to an embodiment includes a video data acquisition unit configured to acquire video data from a camera that captures a video image in a moving direction of a vehicle, a vehicle motion detection unit configured to detect motion information containing a steering angle of the vehicle, an expected path line generation unit configured to generate a first expected path line extending along a planned moving path in accordance with the steering angle from a center part along a width of the vehicle and a third expected path line including a pair of lines extending along a planned moving path of the vehicle from both ends of the vehicle in the width direction, a parking line recognition unit configured to recognize a parking line from the video data, a detection unit configured to detect a nearby object around the vehicle, a determination unit configured to determine to superimpose the first expected path line on the video data when a distance between the nearby object detected by the detection unit and the parking line is larger than a predetermined value, and the parking line and the third expected path line are to be displayed in close proximity to each other, a superimposed video generation unit configured to generate superimposed data, the superimposed data being video data where the first expected path line or the third expected path line is superimposed on the video data in accordance with a determination by the determination unit, and a display control unit configured to transmit the superimposed data to a display unit so as to display a video related to the superimposed data on the display unit.

A display control method according to an embodiment includes acquiring video data from a camera that captures a video image in a moving direction of a vehicle, detecting motion information containing a steering angle of the vehicle, generating a first expected path line extending along a planned moving path in accordance with the steering angle from a center part along a width of the vehicle and a third expected path line including a pair of lines extending along a planned moving path of the vehicle from both ends of the vehicle in the width direction, recognizing a parking line from the video data, detecting a nearby object around the vehicle, determining to superimpose the first expected path line on the video data when a distance between the nearby object detected by the detection unit and the parking line is larger than a predetermined value, and the parking line and the third expected path line are to be displayed in close proximity to each other, generating superimposed data, the superimposed data being video data where the first expected path line or the third expected path line is superimposed on the video data in accordance with a determination, and transmitting the superimposed data to a display unit so as to display a video related to the superimposed data on the display unit.

A display control program according to an embodiment causes a computer to execute acquiring video data from a camera that captures a video image in a moving direction of a vehicle, detecting motion information containing a steering angle of the vehicle, generating a first expected path line extending along a planned moving path in accordance with the steering angle from a center part along a width of the vehicle and a third expected path line including a pair of lines extending along a planned moving path of the vehicle from both ends of the vehicle in the width direction, recognizing a parking line from the video data, detecting a nearby object around the vehicle, determining to superimpose the first expected path line on the video data when a distance between the nearby object detected by the detection unit and the parking line is larger than a predetermined value, and the parking line and the third expected path line are to be displayed in close proximity to each other, generating superimposed data, the superimposed data being video data where the first expected path line or the third expected path line is superimposed on the video data in accordance with a determination, and transmitting the superimposed data to a display unit so as to display a video related to the superimposed data on the display unit.

According to the embodiment, it is possible to provide a display control device, a display control system, a display control method, and a display control program that reduce difficulty of visually recognizing a parking line.

DETAILED DESCRIPTION

Embodiment

Figure 1:
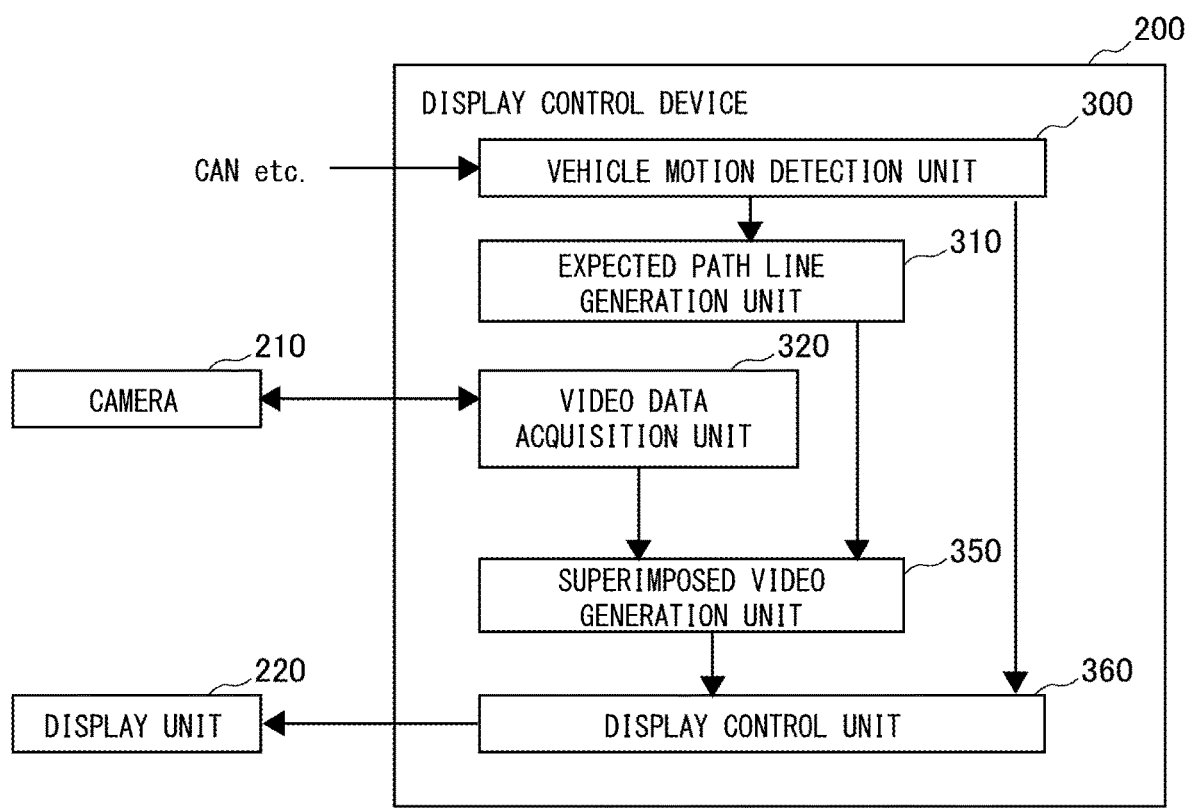
FIG. 1 is a functional block diagram of a display control system 100 according to an embodiment.

Embodiments are described hereinafter with reference to the drawings. FIG. 1 is a functional block diagram of a display control system 100 according to an embodiment. The functional block of the display control system 100 shown in FIG. 1 shows elements common to first to fourth embodiments described hereinbelow.

The display control system 100 is a system that, when a driver is moving a vehicle to a parking space or the like, superimposes an expected path line indicating a planned moving direction on a video image captured by a camera 210 that is mounted on the front or back of the vehicle and takes a video of a vehicle moving direction, and displays this video image on a display unit 220. The display control system 100 may be implemented as one function of a car navigation system, a dashboard camera or the like which can be retrofitted to a vehicle, for example. Further, a display control device 200 may be implemented as one function of a system incorporated into a vehicle when assembling the vehicle in a factory, for example. Furthermore, the display control device 200 may be implemented by combining a system incorporated into a vehicle when assembling the vehicle in a factory and a device that can be retrofitted to a vehicle, for example. The display control system 100 includes the display control device 200 and at least one of the camera 210 and the display unit 220.

The display control device 200 acquires video data, which is data of a video captured by the camera 210, superimposes an expected path line on this data and displays the data on the display unit 220. The display control device 200 may be implemented as a device in various forms such as a computer device that operates when a processor executes a program stored in a memory. The processor may be a microprocessor, an MPU (Micro Processing Unit), or a CPU (Central Processing Unit), for example. The memory is a volatile memory or a nonvolatile memory, and it may be a combination of a volatile memory and a nonvolatile memory. The processor executes one or a plurality of programs including a group of instructions for causing a computer to perform processing according to an embodiment. The display control device 200 is connected with a CAN (Controller Area Network) or the like, which is an in-car network. Further, the display control device 200 is connected with the camera 210 and the display unit 220. The CAN or the like means that it may be an in-car network such as MOST (Media Oriented Systems Transport) or Ethernet, not limited to the CAN.

Further, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The display control device 200 is described hereinafter in detail. The display control device 200 includes a vehicle motion detection unit 300, an expected path line generation unit 310, a video data acquisition unit 320, a superimposed video generation unit 350, and a display control unit 360.

The vehicle motion detection unit 300 receives motion information, which is information about the motion of a vehicle from a CAN or the like, which is an in-car network. The motion information is information containing some or all of information indicating to which range the transmission of a vehicle is set, information indicating the steering angle of a vehicle, and information indicating the traveling speed of a vehicle. Specifically, the vehicle motion detection unit 300 detects a predetermined signal among signals transmitted from a CAN or the like, and transmits this signal to the expected path line generation unit 310 or the display control unit 360. By receiving the motion information, the vehicle motion detection unit 300 can detect that the transmission is set to the reverse range, for example. Further, the vehicle motion detection unit 300 can detect that the transmission is set to the low-speed driving range, for example. Furthermore, the vehicle motion detection unit 300 can detect information indicating the steering angle of a vehicle and monitor the angle of the steering wheel of the vehicle. The vehicle motion detection unit 300 can detect information indicating the traveling speed of a vehicle and monitor the traveling speed of the vehicle.

The expected path line generation unit 310 receives the motion information transmitted from the vehicle motion detection unit 300. Then, the expected path line generation unit 310 generates an expected path line based on the motion information transmitted from the vehicle motion detection unit 300. The expected path line is line information indicating the planned moving path of a vehicle by being superimposed on video data captured by the camera 210. The expected path line generation unit 310 calculates an expected path based on information indicating the steering angle transmitted from the vehicle motion detection unit 300, for example. The expected path line generation unit 310 generates an expected path line from the calculated expected path. An arbitrary existing technique may be applied to the generation of the expected path line by the expected path line generation unit 310. For example, the expected path line generation unit 310 calculates one point or two or more points as expected path points. Then, the expected path line generation unit 310 generates information of the expected path line that passes through the expected path points by a predetermined method. An example of the expected path line is line information indicating lines that extend the vehicle width when the vehicle moves in a straight line. Another example of the expected path line is line information associated with the steering angle of the vehicle. The expected path line generation unit 310 transmits information about the generated expected path line to the superimposed video generation unit 350. The expected path line generation unit 310 generates and transmits information about one or a plurality of expected path lines among the above-described expected path lines.

The video data acquisition unit 320 acquires the video data generated in the camera 210. The video data acquisition unit 320 acquires uncompressed digital video data or analog video data from the camera 210. The video data acquisition unit transmits the video data to the superimposed video generation unit 350 as uncompressed digital video data or compressed video data in a format such as H.264 or H.265, for example. Further, the video data acquisition unit 320 may generate video data in a compressed video format such as MPEG (Moving Picture Experts Group) 2-TS (Transport Stream) or AVI (Audio Video Interleave). The video data acquisition unit 320 transmits the video data to the superimposed video generation unit 350.

The superimposed video generation unit 350 receives the information transmitted from the expected path line generation unit 310 and the video data transmitted from the video data acquisition unit 320. The superimposed video generation unit 350 then superimposes the expected path line on the video data.

The display control unit 360 receives the superimposed data transmitted from the superimposed video generation unit 350. The display control unit 360 transmits the received superimposed data to the display unit 220. The display control unit 360 may transmit the superimposed data to the display unit 220 or stop transmitting the superimposed data in response to an instruction from a display instruction unit, which is not shown, for example. The display control unit 360 may monitor the vehicle motion detection unit 300, and transmit the video data or the superimposed data to the display unit 220 or stop transmitting those data in accordance with information detected by the vehicle motion detection unit 300. Further, the display control unit 360 may connect to the vehicle motion detection unit 300 and acquire vehicle motion information.

The display control unit 360 may process the received superimposed data so as to change the viewing angle of a video image to be displayed on the display unit. Further, the display control unit 360 may process the received superimposed data so as to perform distortion correction of a video image to be displayed on the display unit. Furthermore, the display control unit 360 may process the received superimposed data so as to change a video image to be displayed on the display unit to a video image viewed from the top of the vehicle. The display control unit 360 may process the received superimposed data so as to change a video image to be displayed on the display unit in a way not limited the above.

The camera 210 generates video data that shows a frontward or rearward video of a vehicle. The camera 210 may be placed on the front of a vehicle. Alternatively, the camera 210 may be placed on the back of a vehicle. Further, the camera 210 may be placed on each of the front of a vehicle and the back of the vehicle. The camera 210 transmits the generated video data to the video data acquisition unit 320 in the display control device 200.

The display unit 220 displays the video data or superimposed data received from the display control unit 360 in the display control device 200. The display unit 220 is a display device such as a liquid crystal display device, an organic EL (organic electro-luminescence) display device, or a head-up display, for example. The display unit 220 is placed at a position that can be viewed by a driver while handling a vehicle. The position that can be viewed by a driver while handling a vehicle is a position on a center console, on a dashboard, on a meter panel, on a rear-view mirror, near a steering wheel, on a windshield or the like, for example.

Figure 2:
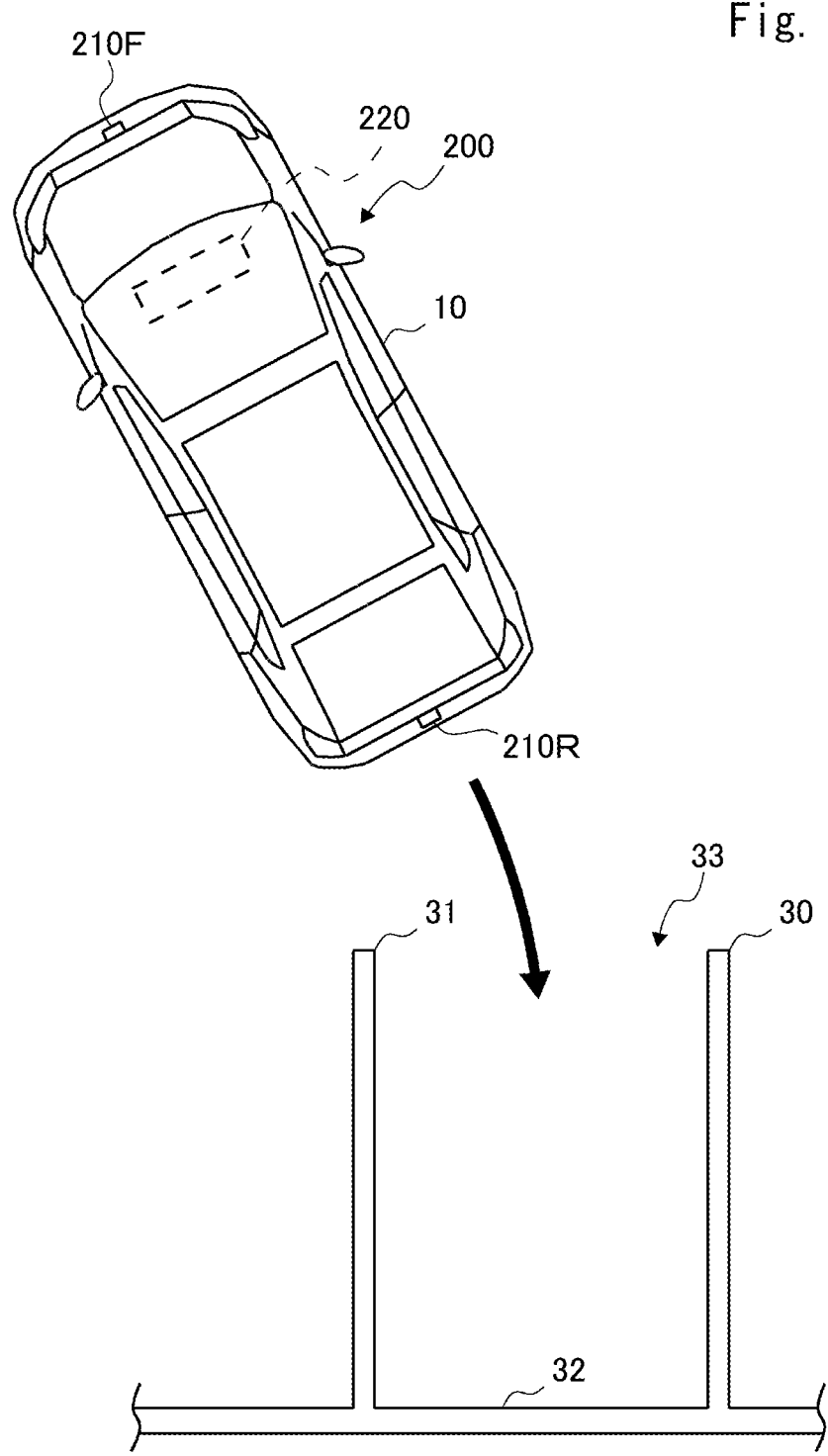
FIG. 2 is a top view showing an example of a state where a vehicle 10 on which the display control system 100 is mounted is moving to a parking space.

A vehicle on which the display control system 100 is mounted is described hereinafter with reference to FIG. 2. FIG. 2 is a top view showing an example of a state where a vehicle 10 on which the display control system 100 is mounted is moving to a parking space. The vehicle 10 includes the display control device 200 at an arbitrary position. The vehicle 10 also includes a forward camera 210F and a rearward camera 210R. The vehicle 10 further includes the display unit 220 at a position that can be viewed by a driver while handling the vehicle. In FIG. 2, the vehicle 10 is moving backward toward a parking space 33. The parking space 33 includes parking lines 30 to 32. The driver is trying to move the vehicle 10 to a position surrounded by the parking lines 30 to 32. In this case, the display control system 100 acquires data of a video captured by the rearward camera 210R.

Figure 3:
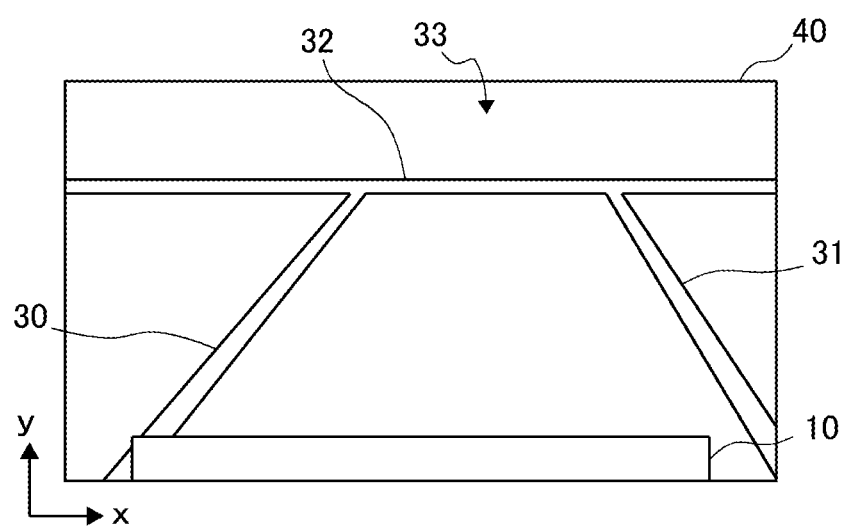
FIG. 3 is a view showing an example of a video image where video data captured using a camera in the vehicle 10 is displayed on a display unit 220.

The video data captured by the camera of the vehicle 10 is described hereinafter. FIG. 3 is a view showing an example of a video image where video data captured by a camera in the vehicle 10 is displayed on the display unit 220. A video image 40 contains a part of the vehicle 10 and the parking lines 30 to 32. The lower side of the video image 40 shows a position closer to the vehicle 10, and the upper side of the video image 40 shows a position farther from the vehicle 10.

FIG. 3 contains x-y coordinates. In FIG. 3, the x-coordinate indicates the horizontal direction of the video image 40. The rightward direction of FIG. 3 is the positive direction of the x-axis. In FIG. 3, the y-coordinate indicates the vertical direction of the video image 40. The upward direction of FIG. 3 is the positive direction of the y-axis. The x-y coordinates in FIG. 3 are shown for the convenience of explaining the positional relationship of elements. The x-y coordinates shown in FIGS. 4 to 7 are shown for the same purpose as the x-y coordinates in FIG. 3.

First Embodiment

In light of the foregoing, a first embodiment is described hereinafter with reference to FIG. 4. In a display control system 100 according to a first embodiment, the expected path line generation unit 310 generates a main expected path line that extends along a planned moving path in accordance with the steering angle from a center part along the width of the vehicle 10. Note that, in the present disclosure, the main expected path line is referred to also as a first expected path line.

Figure 4A:
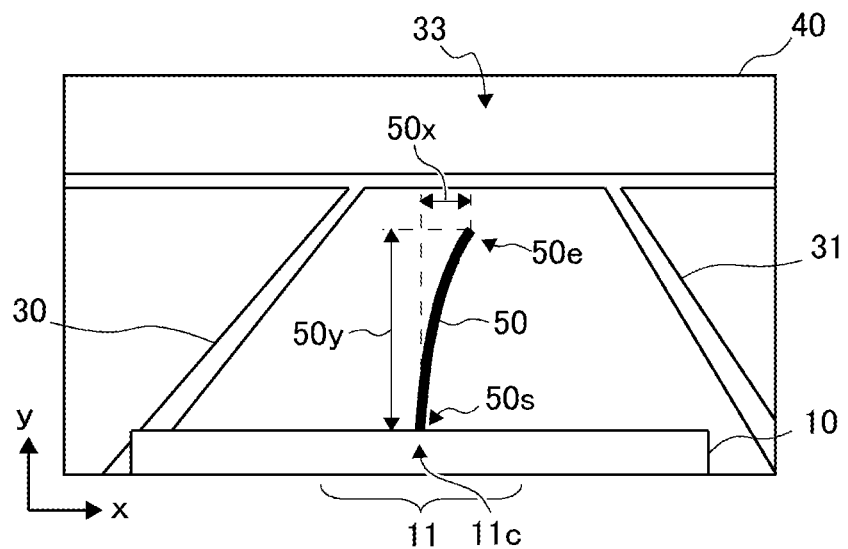
FIG. 4A is a view showing an example of a video image where a main expected path line is superimposed on video data in the display control system 100 according to the first embodiment.

FIG. 4 is a view showing an example of a video image where a main expected path line is superimposed on video data in the display control system 100 according to the first embodiment. A video image 40 in FIG. 4A contains a main expected path line 50 in addition to the video image described in FIG. 3. The main expected path line 50 extends along a planned moving path in accordance with the steering angle from a center part 11 along the width of the vehicle 10. In other words, the main expected path line 50 is line information indicating an expected driving path of the vehicle 10 in accordance with the steering angle of the vehicle 10. The main expected path line 50 is a curved line in accordance with the steering angle of the vehicle 10 except when the vehicle 10 is moving in a straight line. The curvature of the main expected path line 50 is larger as the steering angle of the vehicle 10 is larger.

Figure 4B:
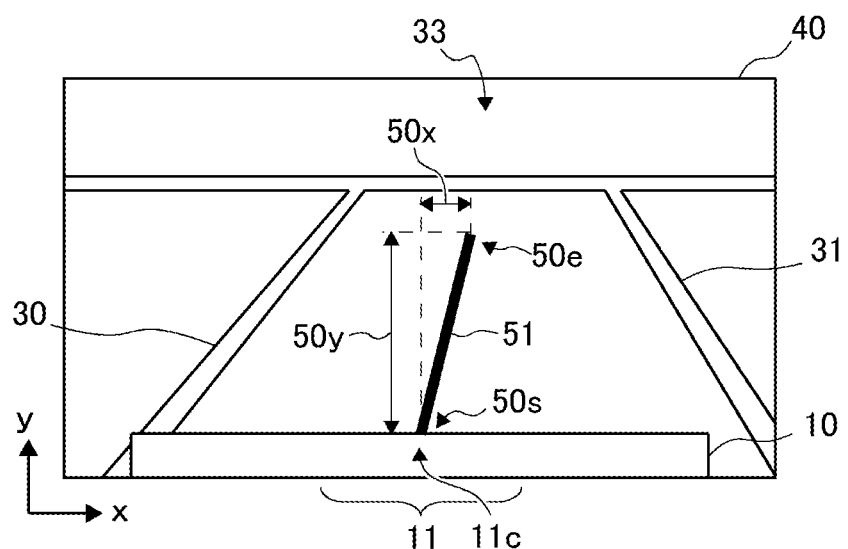
FIG. 4B is a view showing an example of a video image where a main expected path line is superimposed on video data in the display control system 100 according to the first embodiment.

A main expected path line 51 superimposed on the video image 40 shown in FIG. 4B is a straight line. The main expected path line 51 extends linearly from a start point 50s coinciding with the center part 11 of the vehicle 10 along a planned moving path in accordance with the steering angle. Thus, the main expected path line 51 connects the start point 50s and an end point 50e by a straight line. The main expected path line 51 draws a straight line parallel to the y-axis when the vehicle 10 is moving in a straight line. The angle between the main expected path line 51 and the y-axis is larger as the steering angle of the vehicle 10 is larger.

The start point 50s is contained in the center part 11 of the vehicle 10. The center part 11 is a center region that occupies about one-third of the width of the vehicle 10 displayed on the video image 40. The start point 50s may coincide with a center point 11c in the center part 11. The end point 50e is a point on a curved line extending from the start point 50s along the planned moving path in accordance with the steering angle of the vehicle.

The end point 50e may indicate a position where the actual distance from the vehicle 10 corresponds to a predetermined value. In the video image 40, a length 50y in the y-axis direction from the start point 50s to the end point 50e corresponds to a distance of 3 meters, for example, from the center part 11 of the vehicle 10. In this case, the length 50y up to the end point 50e in the y-axis direction can be fixed. Further, the position of the end point 50e in the x-axis direction varies depending on the steering angle of the vehicle 10. As the steering angle of the vehicle 10 is larger, the absolute value of a length 50x in the x-axis direction increases. When the steering direction of the vehicle 10 is right in the video image 40, the main expected path line 50 extends from the center part 11 in the y-axis positive direction and the x-axis positive direction. Likewise, when the steering direction of the vehicle 10 is left in the video image 40, the main expected path line 50 extends from the center part 11 in the y-axis positive direction and the x-axis negative direction.

Note that, the length 50y up to the end point 50e in the y-axis direction may remain unfixed, and it may change to draw a circle or an ellipse around the start point 50s. The length 50y up to the end point 50e in the y-axis direction may remain unfixed, and it may change in such a way that the length of the main expected path line 50 is substantially the same even when the steering angle changes.

The main expected path line 50 is not necessarily a solid line as shown in FIG. 4, and it may be a dashed line or a dotted line. The main expected path line 50 is not necessarily equally bold, and its width may vary from the start point 50s to the end point 50e.

As described above, the main expected path line 50 or the main expected path line 51 extends in the moving direction of the vehicle 10 from the center part 11 of the vehicle 10. Thus, the possibility that the parking line and the main expected path line overlap in the y-axis direction of the video image 40 is reduced when the driver moves the vehicle to the parking space. Therefore, the display control system 100 according to the first embodiment can reduce difficulty of visually recognizing the parking line.

Figure 5:
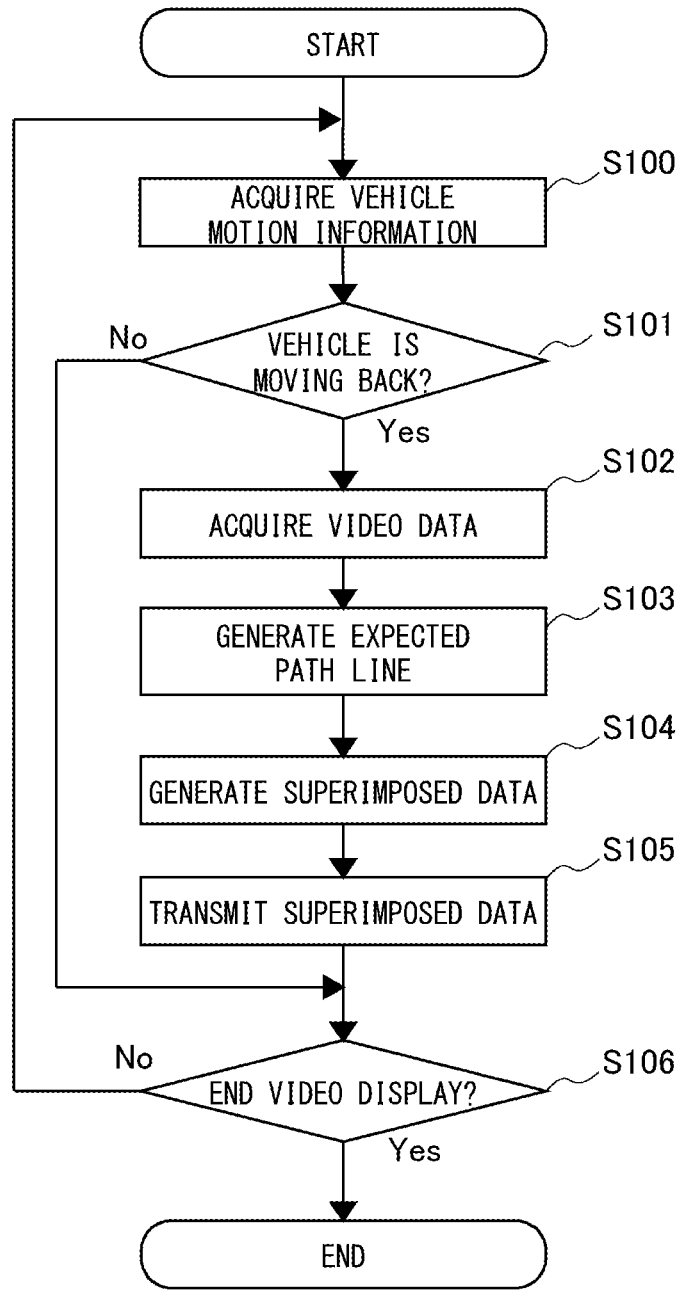
FIG. 5 is a view showing a flowchart in a display control device 200 according to the first embodiment.

A process of the display control device 200 according to the first embodiment is described hereinafter with reference to FIG. 5. FIG. 5 is a view showing a flowchart in the display control device 200 according to this embodiment.

First, the vehicle motion detection unit 300 detects information about the setting of the transmission of the vehicle 10 from a CAN or the like, which is an in-car network (Step S100).

Next, the display control unit 360 acquires the information about the setting of the transmission of the vehicle 10 detected by the vehicle motion detection unit 300, and determines whether the vehicle 10 is to move backward or not (Step S101). When the vehicle 10 is not to move backward, which is, when the setting of the transmission of the vehicle 10 is not a reverse range (No in Step S101), the display control unit 360 determines whether an instruction to end video display is received or not (Step S106). When an instruction to end video display is received (Yes in Step S106), the display control unit 360 ends the process. On the other hand, when an instruction to end video display is not received (No in Step S106), the process returns to Step S100, and the vehicle motion detection unit 300 detects information about the setting of the transmission of the vehicle 10 again.

On the other hand, when the vehicle 10 is moving backward, which is, when the setting of the transmission of the vehicle 10 is a reverse range (Yes in Step S101), the display control unit 360 performs processing of transmitting superimposed data to the display unit 220. Specifically, the video data acquisition unit 320 acquires video data generated by the camera 210 and transmits it to the superimposed video generation unit 350 (Step S102). Further, the expected path line generation unit 310 generates a main expected path line and transmits it to the superimposed video generation unit 350 (Step S103).

Next, the superimposed video generation unit 350 generates superimposed data, which is video data where the expected path line transmitted from the expected path line generation unit 310 is superimposed on the video data transmitted from the video data acquisition unit 320, and transmits this superimposed data to the display control unit 360 (Step S104).

Then, the display control unit 360 transmits the superimposed data transmitted from the superimposed video generation unit 350 to the display unit 220, and displays the data thereon (Step S105). The display control unit 360 then determines whether an instruction to end video display is received or not (Step S106). When an instruction to end video display is received (Yes in Step S106), the display control unit 360 ends the process.

On the other hand, when an instruction to end video display is not received (No in Step S106), the display control device 200 returns to Step S100, and the vehicle motion detection unit 300 detects information about the setting of the transmission of the vehicle 10 again.

The order of performing Step S102 and S103 is arbitrary. Thus, Step S102 and S103 may be interchanged. Alternatively, Step S102 and S103 may be performed in parallel.

The display control system 100 according to the first embodiment performs the above-described process and can thereby reduce difficulty of visually recognizing the parking line displayed on the display unit.

Second Embodiment

A second embodiment is described hereinafter with reference to FIG. 6. A display control system 100 according to the second embodiment is different from the display control system 100 according to the first embodiment in that the expected path line generation unit 310 generates a vehicle width guide line in addition to the main expected path line. The vehicle width guide line is a straight line that intersects with the main expected path line 50 or the expected path line 51, extends along the width of the vehicle 10, and coincides with the width of the vehicle 10. The vehicle width guide line is not limited to a straight line, and it may be a curved line as long as it can appropriately indicate the width of the vehicle 10.

Figure 6A:
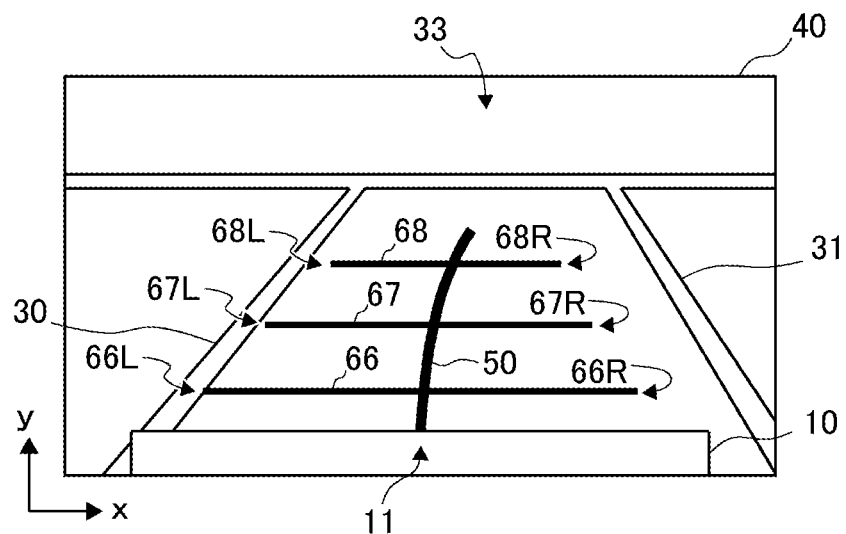
FIG. 6A is a view showing an example of a video image where a main expected path line and a vehicle width guide line are superimposed on video data in the display control system 100 according to a second embodiment.

FIG. 6 is a view showing an example of a video image where a main expected path line and a vehicle width guide line are superimposed on video data in the display control system 100 according to the second embodiment. In the video image 40 shown in FIG. 6A, vehicle width guide lines 66 to 68 are superimposed on the main expected path line 50 described in the first embodiment.

The vehicle width guide lines 66 to 68 are line information extending in the horizontal direction of the video image 40, which is the direction parallel to the x-axis. The vehicle width guide lines 66 to 68 may indicate a predetermined distance from the end of the vehicle 10. The vehicle width guide line 66 may indicate a distance of 0.4 meter from the rear end of the vehicle 10, for example. The vehicle width guide line 67 may indicate a distance of 1.0 meter from the rear end of the vehicle 10, for example. The vehicle width guide line 68 may indicate a distance of 2.0 meters from the rear end of the vehicle 10, for example. In this case, the vehicle width guide lines 66 to 68 may be lines that are not displaced in the y-axis direction in the video image 40. The vehicle width guide lines 66 to 68 do not necessarily extend in the horizontal direction of the video image 40, and they may extend in the orthogonal direction at the intersection with the main expected path line 50.

The length of the vehicle width guide lines 66 to 68 coincides with the width of the vehicle 10. For example, a left end 66L of the vehicle width guide line 66 indicates one end along the width of the vehicle 10 at a distance of 0.4 meter from the rear end of the vehicle 10. On the other hand, a right end 66R of the vehicle width guide line 66 indicates the other end along the width of the vehicle 10 at a distance of 0.4 meter from the rear end of the vehicle 10. Thus, the vehicle width guide line 66 indicates that the vehicle 10 passes through an area between the left end 66L and the right end 66R at a distance of 0.4 meter from the rear end of the vehicle 10, for example. Likewise, the vehicle width guide line 67 indicates that the vehicle 10 passes through an area between a left end 67L and a right end 67R at a distance of 1.0 meter from the rear end of the vehicle 10, for example. Further, the vehicle width guide line 68 indicates that the vehicle 10 passes through an area between a left end 68L and a right end 68R at a distance of 2.0 meters from the rear end of the vehicle 10, for example. The vehicle width guide lines 66 to 68 are displaced in the x-axis direction in the video image 40 in accordance with the steering angle of the vehicle 10.

Figure 6B:
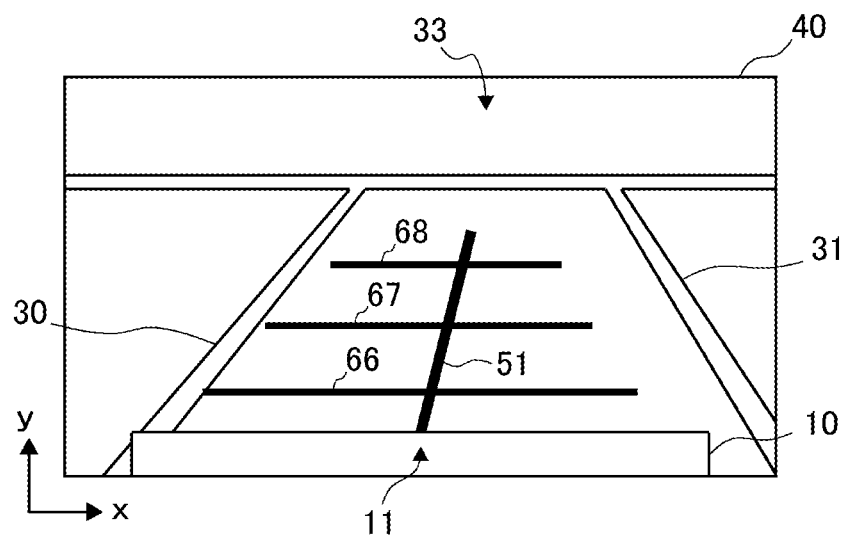
FIG. 6B is a view showing an example of a video image where a main expected path line and a vehicle width guide line are superimposed on video data in the display control system 100 according to the second embodiment.

In the video image 40 shown in FIG. 6B, vehicle width guide lines 66 to 68 are superimposed on the main expected path line 51 described in the first embodiment. The vehicle width guide lines 66 to 68 in the video image 40 shown in FIG. 6B also indicate a predetermined distance in the y-axis direction, just like the example shown in FIG. 6A. The vehicle width guide lines 66 to 68 are displaced in the x-axis direction in the video image 40 in accordance with the steering angle of the vehicle 10.

In this configuration, the possibility that the parking line and the main expected path line overlap in the y-axis direction of the video image 40 is reduced. Further, the display control device 200 according to the second embodiment superimposes vehicle width guide lines and can thereby reduce difficulty of visually recognizing the parking line, and also displays the distance between the vehicle 10 and the parking line and can thereby accurately display the positional relationship between the width of the vehicle 10 and the parking space.

Third Embodiment

A third embodiment is described hereinafter with reference to FIG. 7. A display control system 100 according to the third embodiment is different from the display control system 100 according to the first embodiment in that the expected path line generation unit 310 generates a sub-expected path line in addition to the main expected path line. The sub-expected path line is a pair of expected path lines extending from both ends of the vehicle 10 in the width direction along a planned moving path of the vehicle 10 and having higher transparency than the main expected path line on video data. Note that, in the present disclosure, the sub-expected path line is referred to also as a second expected path line.

Figure 7A:
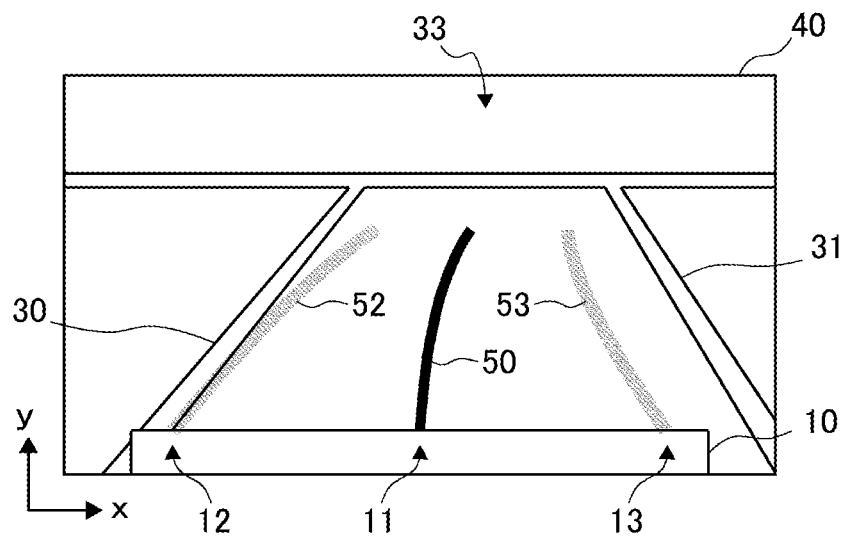
FIG. 7A is a view showing an example of a video image where a main expected path line and a vehicle width guide line are superimposed on video data in the display control system 100 according to a third embodiment.

FIG. 7 is a view showing an example of a video image where a main expected path line and a sub-expected path line are superimposed on video data in the display control system 100 according to the third embodiment. In the video image 40 shown in FIG. 7, sub-expected path lines 52 and 53 are superimposed on the main expected path line 50 described in the first embodiment.

The sub-expected path lines 52 and 53 are a pair of line information associated with the steering angle of the vehicle 10. The sub-expected path lines 52 and 53 are line information indicating an expected driving path of the vehicle 10 in accordance with the steering angle of the vehicle 10. The sub-expected path line 52 extends along a planned moving path in accordance with the steering angle from an end 12 along the width of the vehicle 10. Likewise, the sub-expected path line 53 extends from an end 13 along the width of the vehicle 10 along a planned moving path in accordance with the steering angle. Thus, the sub-expected path lines 52 and 53 extend in the moving direction of the vehicle 10 from the positions corresponding to the width of the vehicle 10. The sub-expected path lines 52 and 53 are curved lines in accordance with the steering angle of the vehicle 10 except when the vehicle 10 is moving in a straight line. The curvature of the sub-expected path lines 52 and 53 is larger as the steering angle of the vehicle 10 is larger.

The sub-expected path lines 52 and 53 have predetermined transparency. The predetermined transparency is 50% to 90%, for example. In a part where the sub-expected path lines 52 and 53 overlap the video data in the superimposed data generated by the superimposed video generation unit 350, the sub-expected path lines 52 and 53 are semi-transparent.

Further, the sub-expected path lines 52 and 53 have higher transparency than the main expected path line 50. For example, when the transparency of the sub-expected path lines 52 and 53 is 50%, the transparency of the main expected path line 50 is 0%. A difference between the transparency of the sub-expected path lines 52 and 53 and the transparency of the main expected path line 50 is preferably 50% or more.

In this configuration, the possibility that the parking line and the main expected path line overlap in the y-axis direction of the video image 40 is reduced. Further, the display control device 200 according to the third embodiment superimposes the sub-expected path lines 52 and 53 and can thereby reduce difficulty of visually recognizing the parking line displayed on the display unit and also accurately display the positional relationship between the width of the vehicle 10 and the parking space.

Figure 7B:
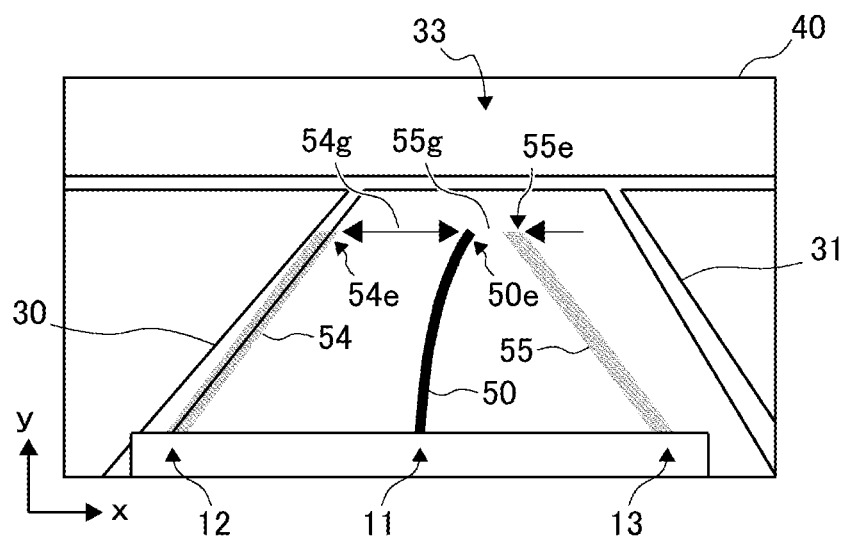
FIG. 7B is a view showing an example of a video image where a main expected path line and a vehicle width guide line are superimposed on video data in the display control system 100 according to the third embodiment.

FIG. 7B is described hereinafter. In the video image 40 shown in FIG. 7B sub-expected path lines 54 and 55 are superimposed on the main expected path line 50.

The sub-expected path lines 54 and 55 are a pair of line information corresponding to the width of the vehicle 10 and extending from the ends along the width of the vehicle 10 when the vehicle 10 moves in a straight line. The sub-expected path line 54 extends in the straight moving direction of the vehicle 10 from an end 12 along the width of the vehicle 10. Likewise, the sub-expected path line 55 extends in the straight moving direction of the vehicle 10 from an end 13 along the width of the vehicle 10. Thus, the sub-expected path lines 54 and 55 extend in the moving direction of the vehicle 10 from the positions corresponding to the width of the vehicle 10. The sub-expected path lines 54 and 55 do not vary depending on the steering angle of the vehicle 10. On the other hand, the main expected path line 50 varies depending on the steering angle. Therefore, a distance 54g between an end point 50e of the main expected path line 50 and an end point 54e of the sub-expected path line 54 varies depending on the steering angle. Specifically, the distance 54g is longer as the steering angle of the vehicle 10 is large to the right. Likewise, a distance 55g between the end point 50e of the main expected path line 50 and an end point 55e of the sub-expected path line 55 is longer as the steering angle of the vehicle 10 is large to the left.

In this configuration, the possibility that the parking line and the main expected path line overlap in the y-axis direction of the video image 40 is reduced. Further, the display control device 200 according to the third embodiment superimposes the sub-expected path lines 54 and 55 and can thereby reduce difficulty of visually recognizing the parking line displayed on the display unit and also accurately display the positional relationship between the width of the vehicle 10 and the parking space and the information about the steering angle.

Fourth Embodiment

A fourth embodiment is described hereinafter with reference to FIG. 8.

A display control system 100 according to the fourth embodiment shows a variation on the display form of a main expected path line. FIG. 8 is a view showing another display example of a main expected path line in the display control system 100 according to the fourth embodiment.

Figure 8A:
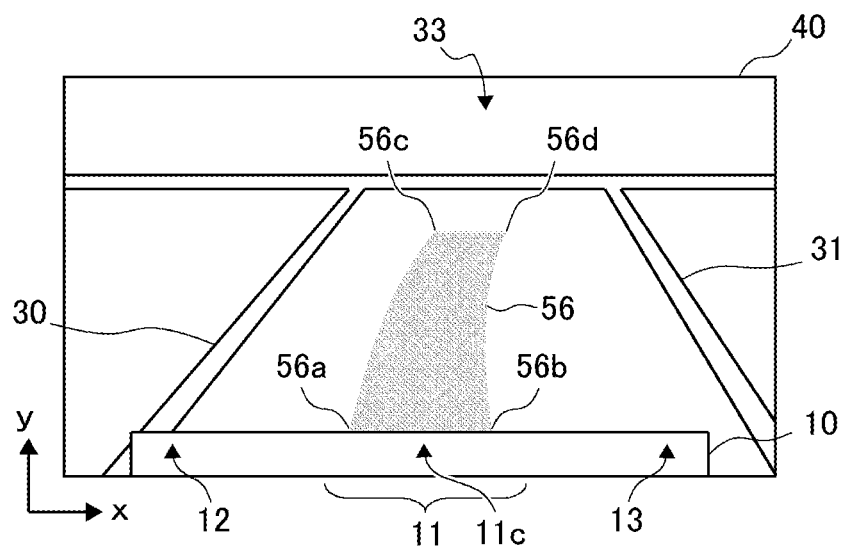
FIG. 8A is a view showing another display example of a main expected path line in the display control system 100 according to a fourth embodiment.

FIG. 8A is a view showing a main expected path line 56 in the display control system 100 according to the fourth embodiment. The main expected path line 56 is a band-like display defined by a start point 56a, a start point 56b, an end point 56c and an end point 56d. The start point 56a and the start point 56b are in the center part 11 along the width of the vehicle 10. The position of the center part 11 in this embodiment is a center region that occupies about one-third of the width of the vehicle 10 displayed on the video image 40.

The end point 56c is on a line extending from the start point 56a in the moving direction of the vehicle 10. The end point 56d is on a line extending from the start point 56b in the moving direction of the vehicle 10. Further, the positions of the end point 56c and the end point 56d in the y-axis direction are such that the distance from the vehicle 10 is a predetermined value. The start point 56a is located between a center point 11c along the width of the vehicle 10 and a left end 12 along the width of the vehicle 10 in the video image 40. The start point 56b is located between the center point 11c along the width of the vehicle 10 and a right end 13 along the width of the vehicle 10 in the video image 40. The start point 56a and the start point 56b are preferably symmetric along the y-axis with respect to the center point 11c. The distance between the start point 56a and the start point 56b may be longer than the distance between the end point 56c and the end point 56d. A line connecting the start point 56a and the end point 56c and a line connecting the start point 56b and the end point 56d may be curved as shown in FIG. 8A. Alternatively, a line connecting the start point 56a and the end point 56c and a line connecting the start point 56b and the end point 56d may be straight.

Figure 8B:
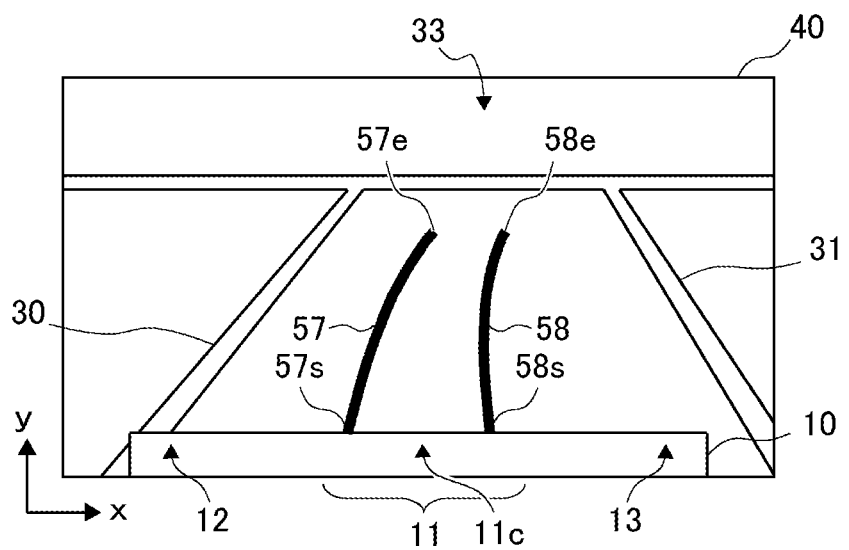
FIG. 8B is a view showing another display example of a main expected path line in the display control system 100 according to the fourth embodiment.

FIG. 8B is a view showing main expected path lines 57 and 58 in the display control system 100 according to the fourth embodiment. A start point 57s and a start point 58s are placed in the center part 11, on both sides of the center point 11c along the width of the vehicle 10.

An end point 57e is on a line extending from the start point 57c in the moving direction of the vehicle 10. An end point 58e is on a line extending from the start point 58s in the moving direction of the vehicle 10. Further, the positions of the end point 57e and the end point 58e in the y-axis direction are such that the distance from the vehicle 10 is a predetermined value.

The start point 57s is located between the center part 11 along the width of the vehicle 10 and the left end 12 along the width of the vehicle 10 in the video image 40. The start point 58s is located between the center part 11 along the width of the vehicle 10 and the right end 13 along the width of the vehicle 10 in the video image 40. The start point 57s and the start point 58s are preferably symmetric along the y-axis with respect to the center point 11c. The distance between the start point 57s and the start point 58s may be longer than the distance between the end point 57e and the end point 58e. A line connecting the start point 57s and the end point 57e and a line connecting the start point 58s and the end point 58e may be curved as shown in FIG. 8B. Alternatively, a line connecting the start point 57s and the end point 57e and a line connecting the start point 58s and the end point 58e may be straight.

The two main expected path lines 57 and 58 shown in FIG. 8B are placed in the center part 11, on both sides of the center point 11c along the width of the vehicle 10. Note that, however, three or more main expected path lines may be placed in the center part 11.

The main expected path lines 56 to 58 extend in the moving direction of the vehicle 10 from the center part 11 of the vehicle 10. Thus, the possibility that the parking line and the main expected path line overlap is reduced when the driver moves the vehicle to the parking space. Further, the main expected path lines 56 to 58 are displayed in such a way that they can be accurately visually recognized by a driver. The display control system 100 according to the fourth embodiment can thereby reduce difficulty of visually recognizing the parking line displayed on the display unit.

The above-described embodiments may be applied to the case where the vehicle 10 moves forward to the parking space 33. In this case, the display control device 200 can superimpose the expected path line on data of a video captured by the forward camera 210F of the vehicle 10. In this case, in Step S100, the display control device 200 can detect that the vehicle 10 is moving forward at a speed slower than a predetermined traveling speed, for example. Alternatively, in Step S100, the display control device 200 may start a first display mode in response to an instruction from a driver, which is not shown.

Fifth Embodiment

Figure 9:
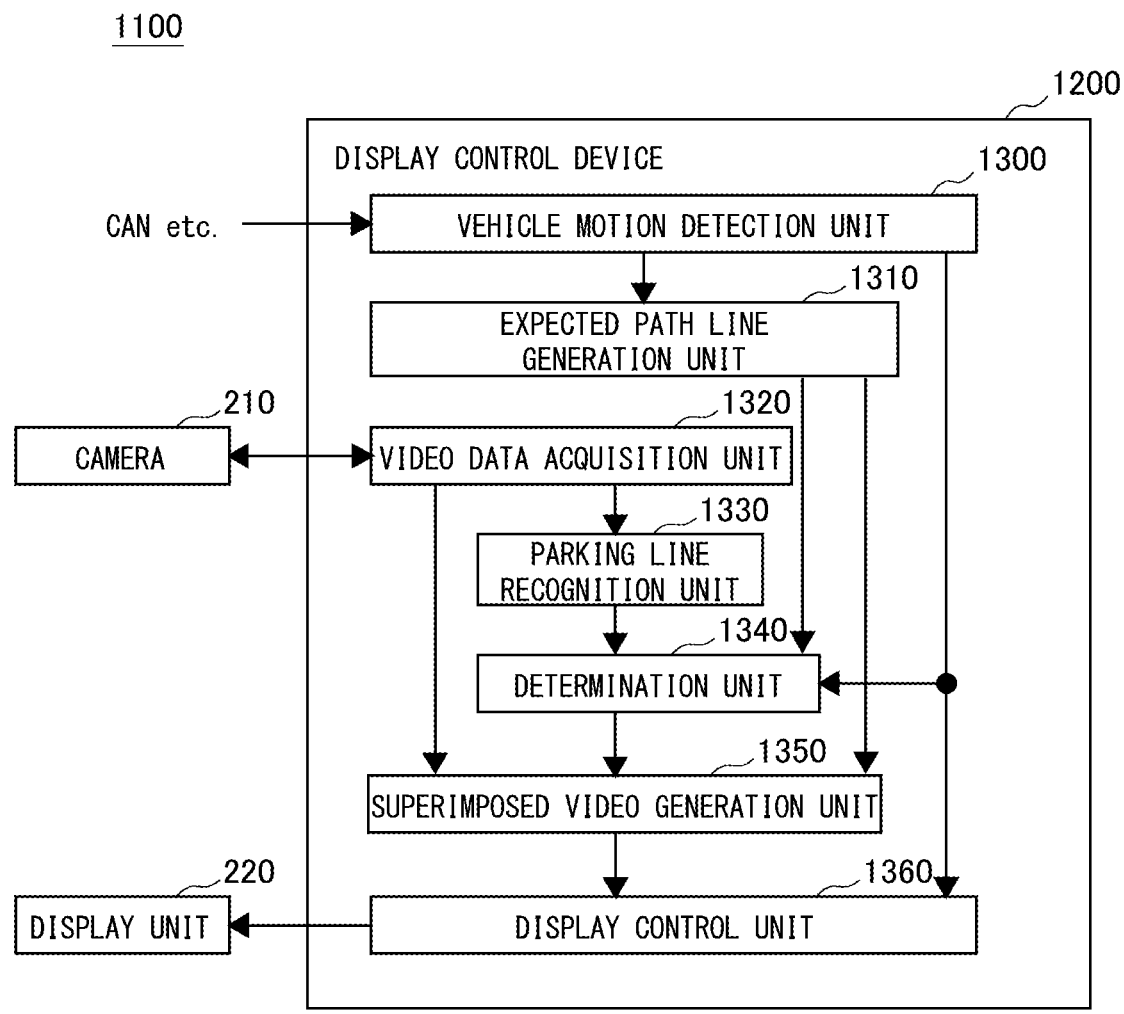
FIG. 9 is a functional block diagram of a display control system 1100 according to a fifth embodiment.

A fifth embodiment of the present invention is described hereinafter with reference to the drawings. FIG. 9 is a functional block diagram of a display control system 1100 according to the fifth embodiment.

The display control system 1100 is a system that, when a driver is moving a vehicle to a parking space or the like, superimposes an expected path line indicating a planned moving direction on a video image captured by a camera 210 that is mounted on the front or back of the vehicle and takes a video of a vehicle moving direction, and displays this video image on a display unit 220. The display control system 1100 may be implemented as one function of a car navigation system, a dashboard camera or the like which can be retrofitted to a vehicle, for example. Further, a display control device 1200 may be implemented as one function of a system incorporated into a vehicle when assembling the vehicle in a factory, for example. Furthermore, the display control device 1200 may be implemented by combining a system incorporated into a vehicle when assembling the vehicle in a factory and a device that can be retrofitted to a vehicle, for example. The display control system 1100 includes the display control device 1200 and at least one of the camera 210 and the display unit 220.

The display control device 1200 acquires video data, which is data of a video captured by the camera 210, superimposes an expected path line on this data and displays the data on the display unit 220. The display control device 1200 may be implemented as a device in various forms such as a computer device that operates when a processor executes a program stored in a memory.

The display control device 1200 is described hereinafter in detail. The display control device 1200 includes a vehicle motion detection unit 1300, an expected path line generation unit 1310, a video data acquisition unit 1320, a parking line recognition unit 1330, a determination unit 1340, a superimposed video generation unit 1350, and a display control unit 1360.

The vehicle motion detection unit 1300 receives motion information, which is information about the motion of a vehicle from a CAN or the like, which is an in-car network. The motion information is information containing some or all of information indicating to which range the transmission of a vehicle is set, information indicating the steering angle of a vehicle, and information indicating the traveling speed of a vehicle. Specifically, the vehicle motion detection unit 1300 can detect a predetermined signal among signals transmitted from a CAN or the like, and transmit this signal to the expected path line generation unit 1310, the determination unit 1340 or the display control unit 1360. By receiving the motion information, the vehicle motion detection unit 1300 can detect that the transmission is set to the reverse range, for example. Further, the vehicle motion detection unit 1300 can detect that the transmission is set to the low-speed driving range, for example. Furthermore, the vehicle motion detection unit 1300 can detect information indicating the steering angle of a vehicle and monitor the angle of the steering wheel of the vehicle. The vehicle motion detection unit 1300 can detect information indicating the traveling speed of a vehicle and monitor the traveling speed of the vehicle.

The expected path line generation unit 1310 receives the motion information transmitted from the vehicle motion detection unit 1300. Then, the expected path line generation unit 1310 generates an expected path line based on the motion information transmitted from the vehicle motion detection unit 1300. The expected path line is line information indicating the planned moving path of a vehicle by being superimposed on video data captured by the camera 210. The expected path line generation unit 1310 calculates an expected path based on information indicating the steering angle transmitted from the vehicle motion detection unit 1300, for example. The expected path line generation unit 1310 generates an expected path line from the calculated expected path. An arbitrary existing technique may be applied to the generation of the expected path line by the expected path line generation unit 1310. For example, the expected path line generation unit 1310 calculates one point or two or more points as expected path points. Then, the expected path line generation unit 1310 generates information of the expected path line that passes through the expected path points by a predetermined method. An example of the expected path line is line information indicating lines that extend the vehicle width when the vehicle moves in a straight line. Another example of the expected path line is line information associated with the steering angle of the vehicle. The expected path line generation unit 1310 transmits information about the generated expected path line to the determination unit 1340 and the superimposed video generation unit 1350. The expected path line generation unit 1310 generates and transmits information about one or a plurality of expected path lines among the above-described expected path lines.

The video data acquisition unit 1320 acquires the video data generated in the camera 210. The video data acquisition unit 1320 acquires uncompressed digital video data or analog video data from the camera 210. The video data acquisition unit transmits the video data to the superimposed video generation unit 1350 as uncompressed digital video data or compressed video data in a format such as H.264 or H.265, for example. Further, the video data acquisition unit 1320 may generate video data in a compressed video format such as MPEG (Moving Picture Experts Group) 2-TS (Transport Stream) or AVI (Audio Video Interleave). The video data acquisition unit 1320 transmits the video data to the parking line recognition unit 1330 and the superimposed video generation unit 1350.

The parking line recognition unit 1330 recognizes parking lines displayed in a parking space from the video data transmitted from the video data acquisition unit 1320. For example, the parking line recognition unit 1330 calculates a luminance gradient of each pixel of the video data and recognizes parking lines by using a predetermined technique such as edge detection. A technique of calculating a luminance gradient of each pixel of video data and recognizing a target object is a known technique. Thus, the detailed description thereof is omitted. The parking line recognition unit 1330 recognizes parking lines and thereby generates information about whether parking lines exist in the video data and the positions of parking lines in the video data. The parking line recognition unit 1330 transmits the generated information to the determination unit 1340. Further, when the parking line recognition unit 1330 does not recognize any parking line, it may transmit information indicating that no parking line is contained in the video data to the determination unit 1340.

The determination unit 1340 receives information transmitted from the vehicle motion detection unit 1300, information transmitted from the expected path line generation unit 1310, or information transmitted from the parking line recognition unit 1330, and determines a display form of the expected path line to be displayed on the display unit 220. The determination unit 1340 transmits information about this determination to the superimposed video generation unit 1350.

The determination unit 1340 can determine a display form of the expected path line based on the information transmitted from the vehicle motion detection unit 1300, for example. Further, the determination unit 1340 calculates the distance between the parking space and the expected path line from the information about the expected path line transmitted from the expected path line generation unit 1310 and the information about the parking line transmitted from the parking line recognition unit 1330, for example. Then, the determination unit 1340 can determine a display form of the expected path line based on the calculation result. Note that, when determining a display form of the expected path line, the determination unit 1340 may give an instruction on the form of the expected path line to be generated to the expected path line generation unit 1310. In this case, the expected path line generation unit 1310 may generate the expected path line based on the instruction from the determination unit 1340.

The determination unit 1340 may determine a display form by determining which expected path line is to be superimposed when there are a plurality of expected path lines, for example. Further, the determination unit 1340 may determine a display form by determining which of a plurality of expected path lines is to be displayed in a less visible form when there are a plurality of expected path lines, for example.

Note that a less visible display form means that it is less noticeable than another display in a video image displayed on the display unit 220. Specifically, a less visible display form is to reduce the width of an expected path line to be superimposed on video data, for example. Further, a less visible display form is to increase the transparency of an expected path line to be superimposed on video data, for example. Furthermore, a less visible display form may include not displaying an expected path line superimposed on video data, for example.

The superimposed video generation unit 1350 receives information transmitted from the expected path line generation unit 1310, information transmitted from the video data acquisition unit 1320, and information transmitted from the determination unit 1340. The superimposed video generation unit 1350 superimposes the expected path line on the video data based on the information transmitted from the determination unit. Specifically, when the superimposed video generation unit 1350 superimposes information about the expected path line transmitted from the expected path line generation unit 1310 on the video data transmitted from the video data acquisition unit 1320, it can change the display form of the expected path line in accordance with the information transmitted from the determination unit 1340.

For example, when the determination unit 1340 has transmitted information about determination indicating that the expected path line is to be displayed in a less visible form, the superimposed video generation unit 1350 superimposes the expected path line in a less visible form on the video data. Alternatively, when the determination unit 1340 has transmitted information about determination indicating that the expected path line is to be displayed not in a less visible form, the superimposed video generation unit 1350 superimposes the expected path line not in a less visible form on the video data. When the expected path line generation unit 1310 transmits information about a plurality of expected path lines, the superimposed video generation unit 1350 superimposes the plurality of expected path lines on the video data in accordance with information about the display form of each expected path line transmitted from the determination unit 1340. In this case, the superimposed video generation unit 1350 can superimpose the expected path line determined to be superimposed on video data among the plurality of expected path lines in accordance with the information transmitted from the determination unit 1340. Specifically, the superimposed video generation unit 1350 may refrain from superimposing the expected path line not determined to be superimposed on video data by the determination unit 1340 on the video data. The superimposed video generation unit 1350 transmits superimposed data, which is video data where the expected path line is superimposed on the video data, to the display control unit 1360. Note that the determination unit 1340 may be included in the superimposed video generation unit 1350.

The display control unit 1360 receives the superimposed data transmitted from the superimposed video generation unit 1350. The display control unit 1360 transmits the received superimposed data to the display unit 220. The display control unit 1360 may transmit the superimposed data to the display unit 220 or stop transmitting the superimposed data in response to an instruction from a display instruction unit, which is not shown, for example. The display control unit 1360 may monitor the vehicle motion detection unit 1300, and transmit the video data or the superimposed data to the display unit 220 or stop transmitting those data in accordance with information detected by the vehicle motion detection unit 1300. Further, the display control unit 1360 may connect to the vehicle motion detection unit 1300 and acquire vehicle motion information.

The display control unit 1360 may process the received superimposed data so as to change the viewing angle of a video image to be displayed on the display unit. Further, the display control unit 1360 may process the received superimposed data so as to perform distortion correction of a video image to be displayed on the display unit. Furthermore, the display control unit 1360 may process the received superimposed data so as to change a video image to be displayed on the display unit to a video image viewed from the top of the vehicle. The display control unit 1360 may process the received superimposed data so as to change a video image to be displayed on the display unit in a way not limited the above.

The camera 210 generates video data that shows a front-ward or rearward video of a vehicle. The camera 210 may be placed on the front of a vehicle. Alternatively, the camera 210 may be placed on the back of a vehicle. Further, the camera 210 may be placed on each of the front of a vehicle and the back of the vehicle. The camera 210 transmits the generated video data to the video data acquisition unit 1320 in the display control device 1200.

The display unit 220 displays the video data or superimposed data received from the display control unit 1360 in the display control device 1200. The display unit 220 is a display device such as a liquid crystal display device, an organic EL (organic electro-luminescence) display device, or a head-up display, for example. The display unit 220 is placed at a position that can be viewed by a driver while handling a vehicle. The position that can be viewed by a driver while handling a vehicle is a position on a center console, on a dashboard, on a meter panel, on a rear-view mirror, near a steering wheel, on a windshield or the like, for example.

Figure 10:
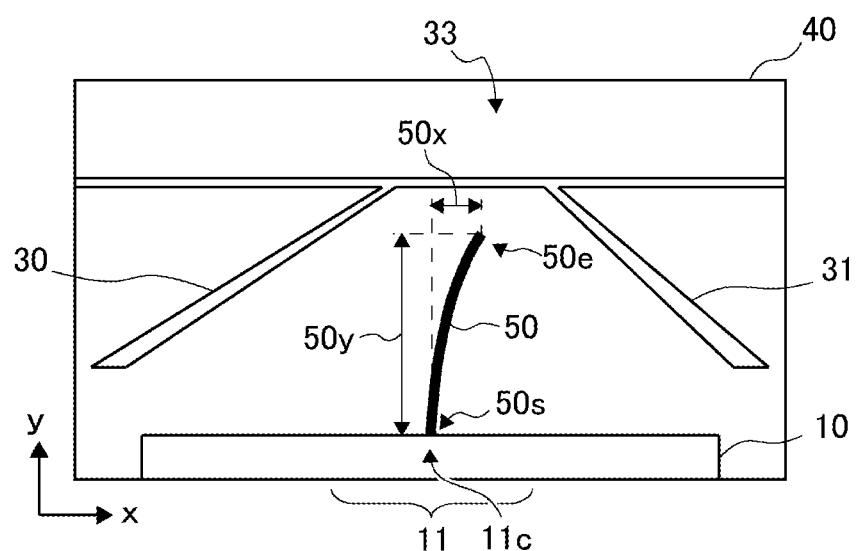
FIG. 10 is a view showing an example of a video image where a first expected path line is superimposed on video data in the display control system 1100 according to the fifth embodiment.

The first expected path line is described hereinafter with reference to FIG. 10. FIG. 10 is a view showing an example of a video image where a first expected path line is superimposed on video data in the display control system 1100 according to the fifth embodiment. The video image 40 in FIG. 10 contains a first expected path line 50 in addition to the video image described in FIG. 3. The first expected path line 50 extends along a planned moving path in accordance with the steering angle from a center part 11 along the width of the vehicle 10. In other words, the first expected path line 50 is line information indicating an expected driving path of the vehicle 10 in accordance with the steering angle of the vehicle 10. The first expected path line 50 is a curved line in accordance with the steering angle of the vehicle 10 except when the vehicle 10 is moving in a straight line. The curvature of the first expected path line 50 is larger as the steering angle of the vehicle 10 is larger.

The start point 50s is contained in the center part 11 of the vehicle 10. The center part 11 is a center region that occupies about one-third of the width of the vehicle 10 displayed on the video image 40. The start point 50s may coincide with a center point 11c in the center part 11. The end point 50e is a point on a curved line extending from the start point 50s along the planned moving path in accordance with the steering angle of the vehicle.

The end point 50e may indicate a position where the actual distance from the vehicle 10 corresponds to a predetermined value. In the video image 40, a length 50y in the y-axis direction from the start point 50s to the end point 50e corresponds to a distance of 3 meters, for example, from the center part 11 of the vehicle 10. In this case, the length 50y up to the end point 50e in the y-axis direction can be fixed. Further, the position of the end point 50e in the x-axis direction varies depending on the steering angle of the vehicle 10. As the steering angle of the vehicle 10 is larger, the absolute value of a length 50x in the x-axis direction increases. When the steering direction of the vehicle 10 is right in the video image 40, the first expected path line 50 extends from the center part 11 in the y-axis positive direction and the x-axis positive direction. Likewise, when the steering direction of the vehicle 10 is left in the video image 40, the first expected path line 50 extends from the center part 11 in the y-axis positive direction and the x-axis negative direction.

Note that, the length 50y up to the end point 50e in the y-axis direction may remain unfixed, and it may change to draw a circle or an ellipse around the start point 50s. The length 50y up to the end point 50e in the y-axis direction may remain unfixed, and it may change in such a way that the length of the first expected path line 50 is substantially the same even when the steering angle changes.

The first expected path line 50 is not necessarily a solid line as shown in FIGS. 10 and 10B, and it may be a dashed line or a dotted line. The first expected path line 50 is not necessarily equally bold, and their width may vary from the start point 50s to the end point 50e.

Further, the position of the center part 11 in this embodiment is a center region that occupies about one-third of the width of the vehicle 10 displayed on the video image 40. The start point 50s may coincide with the center point 11c in the center part 11.

Note that the display form of superimposing the first expected path line 50 on video data is referred to as a first display mode.

As described above, the first expected path line 50 extends in the moving direction of the vehicle 10 from the center part 11 of the vehicle 10. Thus, the possibility that the parking line and the first expected path line overlap is reduced when the driver moves the vehicle to the parking space.

A third expected path line is described hereinafter with reference to FIG. 11. FIG. 11 is a view showing an example of a video image where a third expected path line is superimposed on video data in the display control system 1100 according to the fifth embodiment. The video image 40 in FIG. 11 contains a third expected path line 60, a third expected path line 61 and distance indicator lines 166 to 168, in addition to the video image described in FIG. 3. The third expected path line 60 extends along a planned moving path of a vehicle from a left end 12 along the width of the vehicle in the video image 40. The third expected path line 61 extends along a planned moving path of a vehicle from a right end 13 along the width of the vehicle in the video image 40. The third expected path lines 60 and 61 are a pair of line information extending along a planned moving path of a vehicle from both ends of the vehicle in the width direction. The third expected path lines 60 and 61 may be line information associated with the steering angle of the vehicle and indicating an expected driving path of the vehicle in accordance with the steering angle of the vehicle. The length of the third expected path lines 60 and 61 in the y-axis direction corresponds to a distance of 3 meters, for example, from the both ends of the vehicle 10, just like the length 50y of the first expected path line 50 described in FIG. 10.

The distance indicator lines 166 to 168 are line information extending horizontally to connect the third expected path line 60 on the left and the third expected path line 61 on the right in the video image 40. The distance indicator lines 166 to 168 indicate a predetermined distance from the end of the vehicle 10. The distance indicator line 166 indicates a distance of 0.4 meter from the rear end of the vehicle 10, for example. The distance indicator line 167 indicates a distance of 1.0 meter from the rear end of the vehicle 10, for example. The distance indicator line 168 indicates a distance of 2.0 meters from the rear end of the vehicle 10, for example.

Figure 11A:
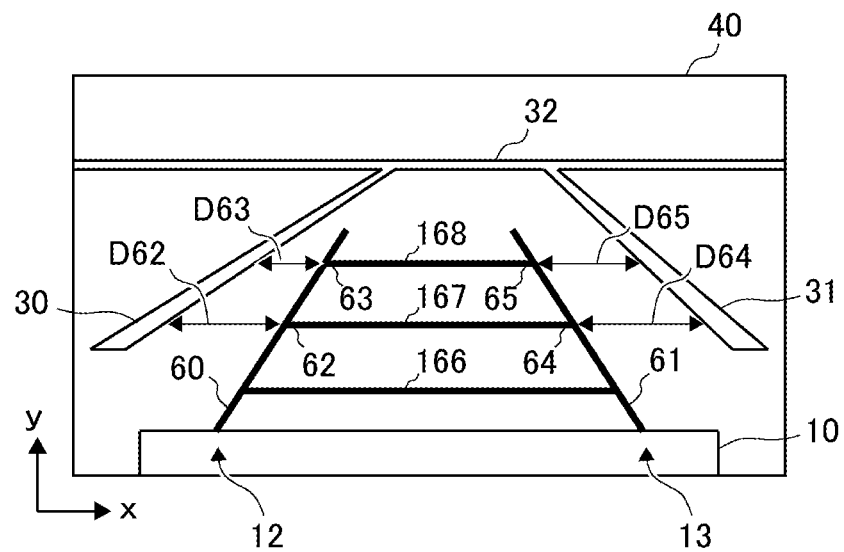
FIG. 11A is a view showing an example of a video image where a second expected path line is superimposed on video data in the display control system 1100 according to the fifth embodiment.
Figure 11B:
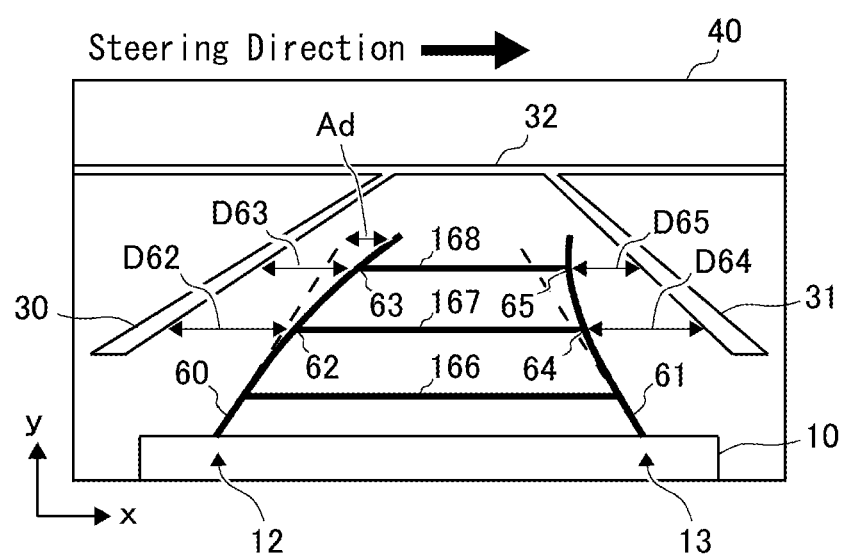
FIG. 11B is a view showing an example of a video image where a second expected path line is superimposed on video data in the display control system 1100 according to the fifth embodiment.

FIG. 11A shows the third expected path lines 60 and 61 in the state where the steering angle is 0° and the vehicle moves in a straight line. FIG. 11B shows the third expected path lines 60 and 61 in the state where the steering wheel of the vehicle 10 is controlled in the steering direction indicated by the arrow. By looking at video data on which the third expected path line 60, the third expected path line 61 and the distance indicator lines 166 to 168 are superimposed when moving the vehicle, the driver can grasp the distance between the vehicle's expected path line and a parking space 32 and the vehicle.

The determination unit 1340 can calculate the distance between the left parking line 30 and the left third expected path line 60 contained in the video image 40. To be specific, the determination unit 1340 sets a reference point 62 and a reference point 63 along the third expected path line 60, for example. The vertical positions of the reference point 62 and the reference point 63 can be predetermined positions. The horizontal positions of the reference point 62 and the reference point 63 can vary depending on the position of the third expected path line 60. Then, the determination unit 1340 calculates a distance D62 between the reference point 62 and the parking line 30 in the horizontal direction. Further, the determination unit 1340 calculates a distance D63 between the reference point 63 and the parking line 30 in the horizontal direction. Then, the determination unit 1340 can determine whether the calculated distance D62 and distance D63 are within a predetermined range or not.

The case where the distance D62 and the distance D63 are within a predetermined range includes the case where the parking line 30 and the third expected path line 60 are close to each other, the case where the parking line 30 and the third expected path line 60 are in contact with each other, or the case where the parking line 30 and the third expected path line 60 intersect with each other. Note that each of a predetermined range for the distance D62 and a predetermined range for the distance D63 is set appropriately, and they may be the same range or difference ranges.

The determination unit 1340 calculates the distance between the right parking line 31 and the right third expected path line 61 contained in the video image 40, just like the example of the left side described above. To be specific, the determination unit 1340 sets a reference point 64 and a reference point 65 along the third expected path line 61, just like the case of calculating the distance between the left parking line 30 and the left third expected path line 60. Then, the determination unit 1340 calculates a distance D64 between the reference point 64 and the parking line 31 in the horizontal direction. Further, the determination unit 1340 calculates a distance D65 between the reference point 65 and the parking line 31 in the horizontal direction. Then, the determination unit 1340 can determine whether the calculated distance D64 and distance D65 are within a predetermined range or not.

The determination unit 1340 can determine the display form of the third expected path lines 60 and 61 based on the distance information calculated in this manner. For example, the determination unit 1340 may determine to display the third expected path lines 60 and 61 in a less visible form when it determines that any of the distance between the parking line 30 and the third expected path line 60 and the distance between the parking line 31 and the third expected path line 61 is shorter than a predetermined distance. Further, the determination unit 1340 may determine to display the first expected path line, which is described with reference to FIG. 10, instead of the third expected path lines 60 and 61, when it determines that any of the distance between the parking line 30 and the third expected path line 60 and the distance between the parking line 31 and the third expected path line 61 is shorter than a predetermined distance.

The third expected path lines 60 and 61 may be associated with the steering angle of the vehicle. In this case, the distances D62 to D65 vary depending on the steering angle of the vehicle. For example, comparing the distance D63 in FIG. 11A and the distance D63 in FIG. 11B, the distance D63 in FIG. 11B is longer than the distance D63 in FIG. 11A. In this case, the steering angle is approximately 0° in FIG. 11A, and it changes to the right as indicated by the arrow in FIG. 11B. The steering angle in FIG. 11B is a steering angle Ad. Likewise, comparing the distance D65 in FIG. 11A and the distance D65 in FIG. 11B, the distance D65 in FIG. 11B is shorter than the distance D65 in FIG. 11A.

Note that the display form of superimposing the third expected path lines 60 and 61 on video data is referred to as a second display mode.

In this configuration, a driver can adjust the steering angle of a vehicle by looking at the third expected path lines 60 and 61 when moving the vehicle to a parking space. Further, a driver can adjust the stop position at the front or back of the vehicle by looking at the distance indicator lines 166 to 168. However, the third expected path lines 60 and 61 overlap a parking line in some cases. In such cases, it is difficult for a driver to find out the parking line in the displayed video image. Thus, there are cases where it is difficult for a driver to grasp the positional relationship between the vehicle and the parking space.

In the display control system 1100 according to the fifth embodiment, the determination unit 1340 determines to set the display form to the first display mode when the parking line 30 and 31 and the third expected path line 60 and 61 are respectively displayed in close proximity to each other.

For example, in the case where the vehicle 10 is moving with the steering angle close to a straight line motion, the third expected path line 60 and 61 and the parking line 30 and 31 displayed along the moving direction of the vehicle 10 are likely to be respectively displayed in parallel. In this case, the parking line 30 and 31 and the third expected path line 60 and 61 are likely to be respectively displayed in close proximity to each other. Thus, the determination unit 1340 determines the display form depending on whether the steering angle Ad is smaller than a predetermined angle. When the steering angle Ad is smaller than a predetermined angle, the determination unit 1340 determines to set the display form to the first display mode. The case where the steering angle Ad is smaller than a predetermined angle is when the steering angle Ad is smaller than 10°, for example.

Figure 12:
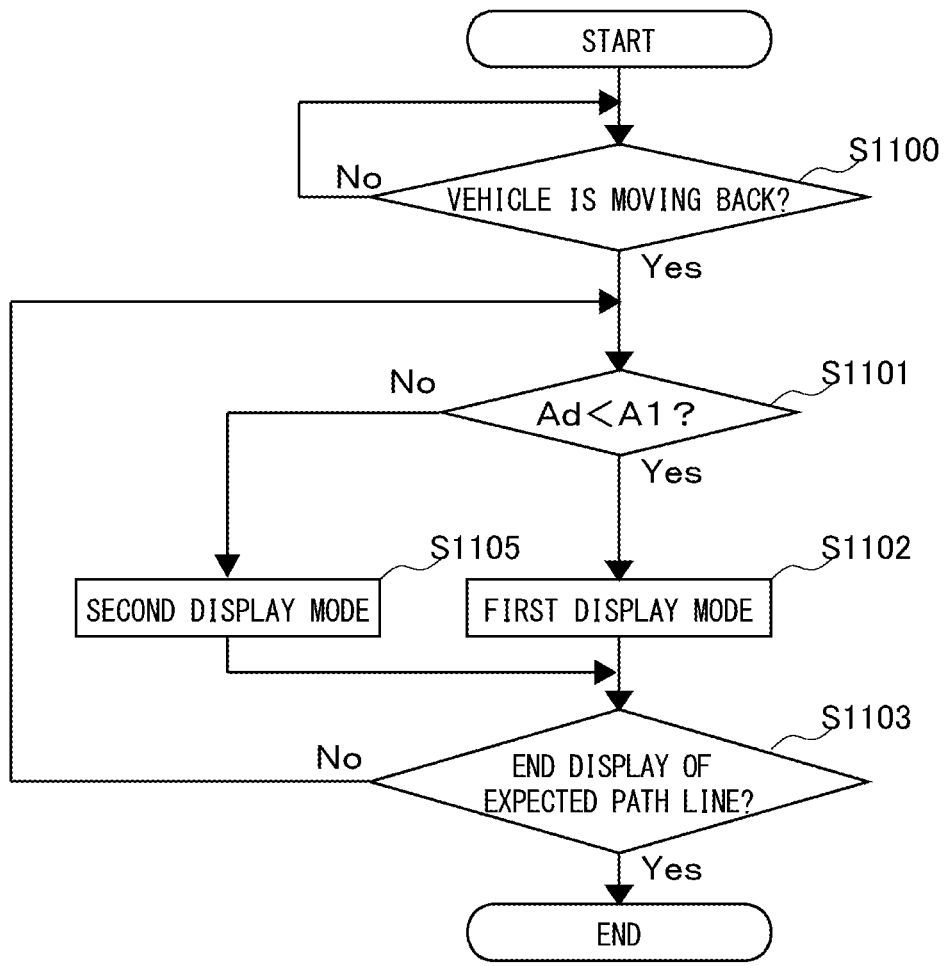
FIG. 12 is a view showing a flowchart in a display control device 1200 according to the fifth embodiment.

A process of the display control device 1200 according to the fifth embodiment is described hereinafter with reference to FIG. 12. FIG. 12 is a view showing a flowchart in the display control device 1200 according to the fifth embodiment.

First, in the display control device 1200, the vehicle motion detection unit 1300 detects information about the setting of the transmission of the vehicle 10 from a CAN or the like, which is an in-car network. Next, the display control unit 1360 acquires the information about the setting of the transmission of the vehicle 10 detected by the vehicle motion detection unit 1300, and determines whether the vehicle 10 is to move backward or not (Step S1100).

When the vehicle 10 is not to move backward, which is, when the setting of the transmission of the vehicle 10 is not a reverse range (No in Step S1100), the display control unit 1360 acquires information about the setting of the transmission of the vehicle 10 detected by the vehicle motion detection unit 1300 and performs processing of Step S1100 again.

On the other hand, when the vehicle 10 is moving backward, which is, when the setting of the transmission of the vehicle 10 is a reverse range (Yes in Step S1100), the display control device 1200 proceeds to Step S1101 to start processing of transmitting superimposed data to the display unit 220.

Then, the determination unit 1340 acquires information about the setting of the transmission of the vehicle 10 detected by the vehicle motion detection unit 1300, and determines whether the steering angle Ad is smaller than a predetermined angle A1 or not (Step S1101). When the determination unit 1340 determines that the steering angle Ad is smaller than the predetermined angle A1 (Yes in Step S1101), the determination unit 1340 transmits information indicating generation of superimposed data in the first display mode to the superimposed video generation unit 1350 (Step S1102). Therefore, the superimposed video generation unit 1350 superimposes the video data transmitted from the expected path line generation unit 1310 on the video data transmitted from the video data acquisition unit 1320 in the first display mode. The display control unit 1360 transmits the superimposed data in the first display mode transmitted from the superimposed video generation unit 1350 to the display unit 220.

On the other hand, when the determination unit 1340 does not determine that the steering angle Ad is smaller than the predetermined angle A1 (No in Step S1101), the determination unit 1340 transmits information indicating generation of superimposed data in the second display mode to the superimposed video generation unit 1350 (Step S1105). Therefore, the superimposed video generation unit 1350 superimposes the video data transmitted from the expected path line generation unit 1310 on the video data transmitted from the video data acquisition unit 1320 in the second display mode. The display control unit 1360 transmits the superimposed data in the second display mode transmitted from the superimposed video generation unit 1350 to the display unit 220.

Then, after the determination unit 1340 determines the display form in Step S1102 or S1105, the display control unit 1360 determines whether or not to end the display of the expected path line (S1103). To be specific, the display control unit 1360 determines whether the setting of the transmission of the vehicle 10 is a reverse range or not by monitoring the vehicle motion detection unit 1300, for example. When the setting of the transmission of the vehicle 10 is not a reverse range (Yes in Step S1103), the display control device 1200 determines to end the display of the expected path line. On the other hand, when the setting of the transmission of the vehicle 10 is a reverse range (No in Step S1103), the display control device 1200 does not end the display of the expected path line. In this case, the process returns to Step S1101, and the determination unit 1340 acquires the information about the setting of the transmission of the vehicle 10 detected by the vehicle motion detection unit 1300, and continues processing.

By performing the above process, the display control system 1100 according to the fifth embodiment can reduce difficulty of visually recognizing the parking line displayed on the display unit.

Sixth Embodiment

A sixth embodiment is described hereinafter with reference to FIG. 13. A display control system 1100 according to the sixth embodiment is different from the display control system 1100 according to the fifth embodiment in that the determination unit 1340 makes determination based on the distance between a parking line and the third expected path lines 60 and 61.

Figure 13A:
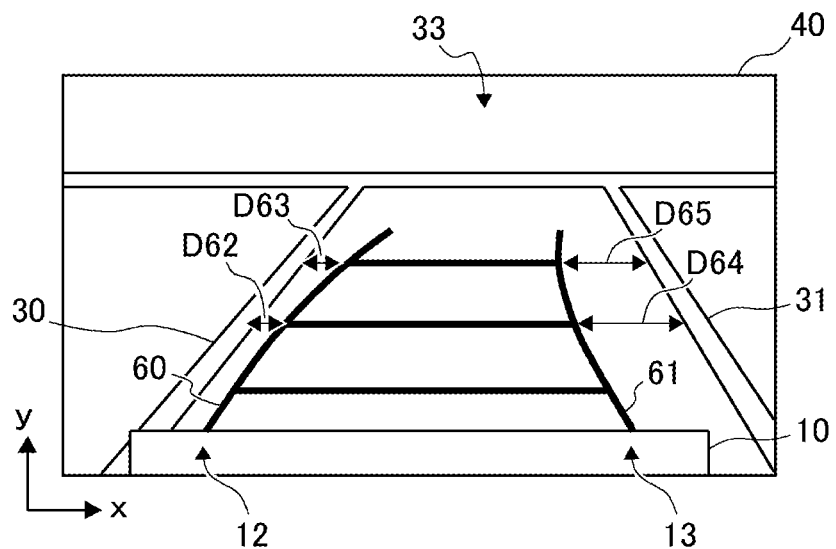
FIG. 13A is a view showing an example of a video image in the display control system 1100 according to a sixth embodiment.

FIG. 13 is a view showing an example of a video image in the display control system 1100 according to the sixth embodiment. In FIG. 13A, the third expected path lines 60 and 61 and the distance indicator lines 166 to 168 are superimposed on the video data acquired by the video data acquisition unit 1320. The display form of the video image 40 shown in FIG. 13A is the second display mode.

The determination unit 1340 calculates the distance between the left parking line 30 and the left third expected path line 60 in the video image 40, as described above with reference to FIG. 11. Likewise, the determination unit 1340 calculates the distance between the right parking line 31 and the right third expected path line 61 in the video image 40. The determination unit 1340 thereby calculates each of the distances D62 to D65.

In FIG. 13A, the distance D62 and the distance D63 are within a predetermined range. Stated differently, the parking line 30 and the third expected path line 60 are in close proximity to each other. In such cases, it is difficult for a driver to find out the parking line 30 in the video image 40. Thus, there are cases where it is difficult for the driver to grasp the positional relationship between the vehicle and the parking space. Therefore, when the distance between the third expected path line 60 and 61 and the parking line 30 and 31 is within a predetermined range, the determination unit 1340 determines that the parking line 30 and 31 and the third expected path line 60 and 61 are displayed in close proximity to each other.

Figure 13B:
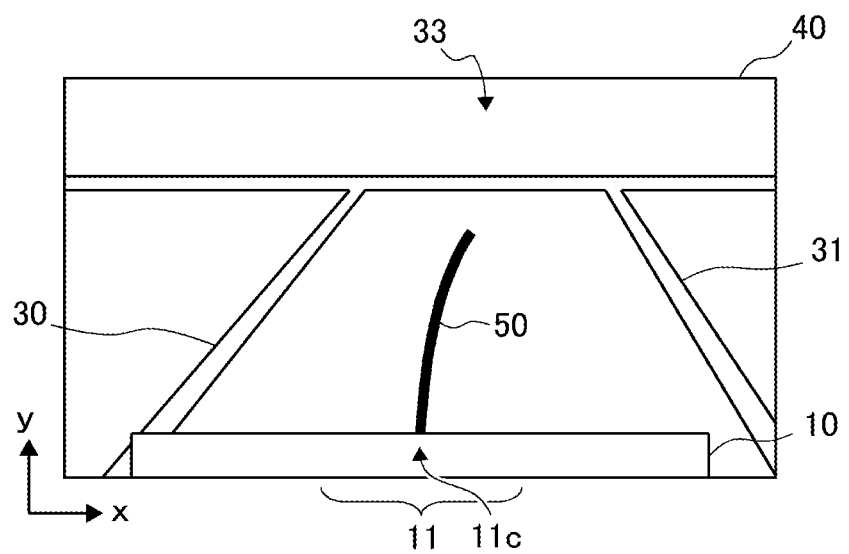
FIG. 13B is a view showing an example of a video image in the display control system 1100 according to the sixth embodiment.

When the distance between the third expected path line 60 and 61 and the parking line 30 and 31 is within a predetermined range, the determination unit 1340 determines to set the display form of the video image 40 to the first display mode. In FIG. 13B, the first expected path line 50 is superimposed on the video data acquired by the video data acquisition unit 1320. The display form of the video image 40 shown in FIG. 13B is the first display mode.

The first expected path line 50 extends in the moving direction of the vehicle 10 from the center part 11 of the vehicle 10. Thus, the possibility that the parking line and the first expected path line overlap is reduced when the driver moves the vehicle to the parking space. Thus, the display control system 1100 according to the sixth embodiment can reduce difficulty of visually recognizing the parking line displayed on the display unit.

Figure 14:
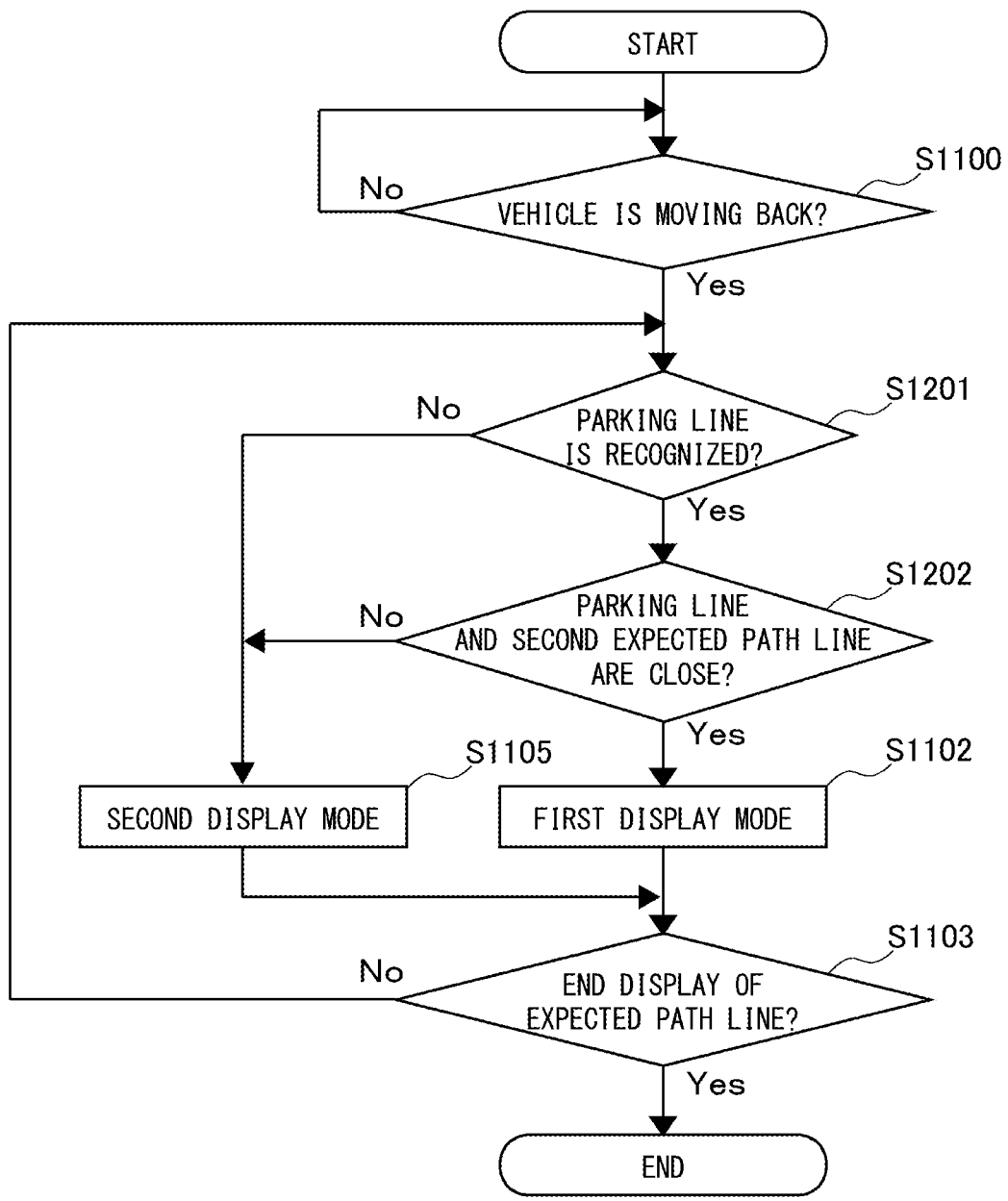
FIG. 14 is a view showing a flowchart in the display control device 1200 according to the sixth embodiment.

A process of the display control device 1200 according to the sixth embodiment is described hereinafter with reference to FIG. 14. FIG. 14 is a view showing a flowchart in the display control device 1200 according to the sixth embodiment. The flowchart of the display control device 1200 according to the sixth embodiment is different from the flowchart of the display control device 1200 according to the fifth embodiment in processing between Step S1100 and Step S1102.

When the vehicle 10 is moving backward, which is, when the setting of the transmission of the vehicle 10 is a reverse range (Yes in Step S1100), the display control device 1200 proceeds to Step S1201 to start processing of transmitting superimposed data to the display unit 220.

In Step S1201, the determination unit 1340 determines whether the parking line recognition unit 1330 recognizes a parking line or not (Step S1201). When the parking line recognition unit 1330 does not recognize a parking line (No in Step S1201), the determination unit 1340 transmits information indicating generation of superimposed data in the second display mode to the superimposed video generation unit 1350 (Step S1105).

On the other hand, when the parking line recognition unit 1330 recognizes a parking line (Yes in Step S1201), the determination unit 1340 determines whether the parking line and the third expected path line are close to each other or not from the information about the parking line transmitted from the parking line recognition unit 1330 and the information about the expected path line transmitted from the expected path line generation unit 1310 (Step S1202). To be specific, the determination unit 1340 calculates the distances D62 to D65 as described above with reference to FIG. 13, for example. Then, the determination unit 1340 determines whether the calculated distances D62 to D65 are within a predetermined range or not.

When the determination unit 1340 does not determine that the parking line and the third expected path line are close to each other (No in Step S1202), the determination unit 1340 transmits information indicating generation of superimposed data in the second display mode to the superimposed video generation unit 1350 (Step S1105).

When the determination unit 1340 determines that the parking line and the third expected path line are close to each other (Yes in Step S1202), the determination unit 1340 transmits information indicating generation of superimposed data in the first display mode to the superimposed video generation unit 1350 (Step S1102).

Then, after the determination unit 1340 determines the display form in Step S1102 or S1105, the display control unit 1360 determines whether or not to end the display of the expected path line (S1103). To be specific, the display control unit 1360 determines whether the setting of the transmission of the vehicle 10 is a reverse range or not by monitoring the vehicle motion detection unit 1300, for example. When the setting of the transmission of the vehicle 10 is not a reverse range (Yes in Step S1103), the display control device 1200 determines to end the display of the expected path line. On the other hand, when the setting of the transmission of the vehicle 10 is a reverse range (No in Step S1103), the display control device 1200 does not end the display of the expected path line. In this case, the process returns to Step S1101, and the determination unit 1340 acquires the information about the setting of the transmission of the vehicle 10 detected by the vehicle motion detection unit 1300, and continues processing.

By performing the above process, the display control system 1100 according to the sixth embodiment can reduce difficulty of visually recognizing the parking line displayed on the display unit.

Seventh Embodiment

A seventh embodiment is described hereinafter. A display control device according to the seventh embodiment further includes an object detection sensor that detects an object existing around a vehicle a detection unit that functions as a sensor detection unit.

Figure 15:
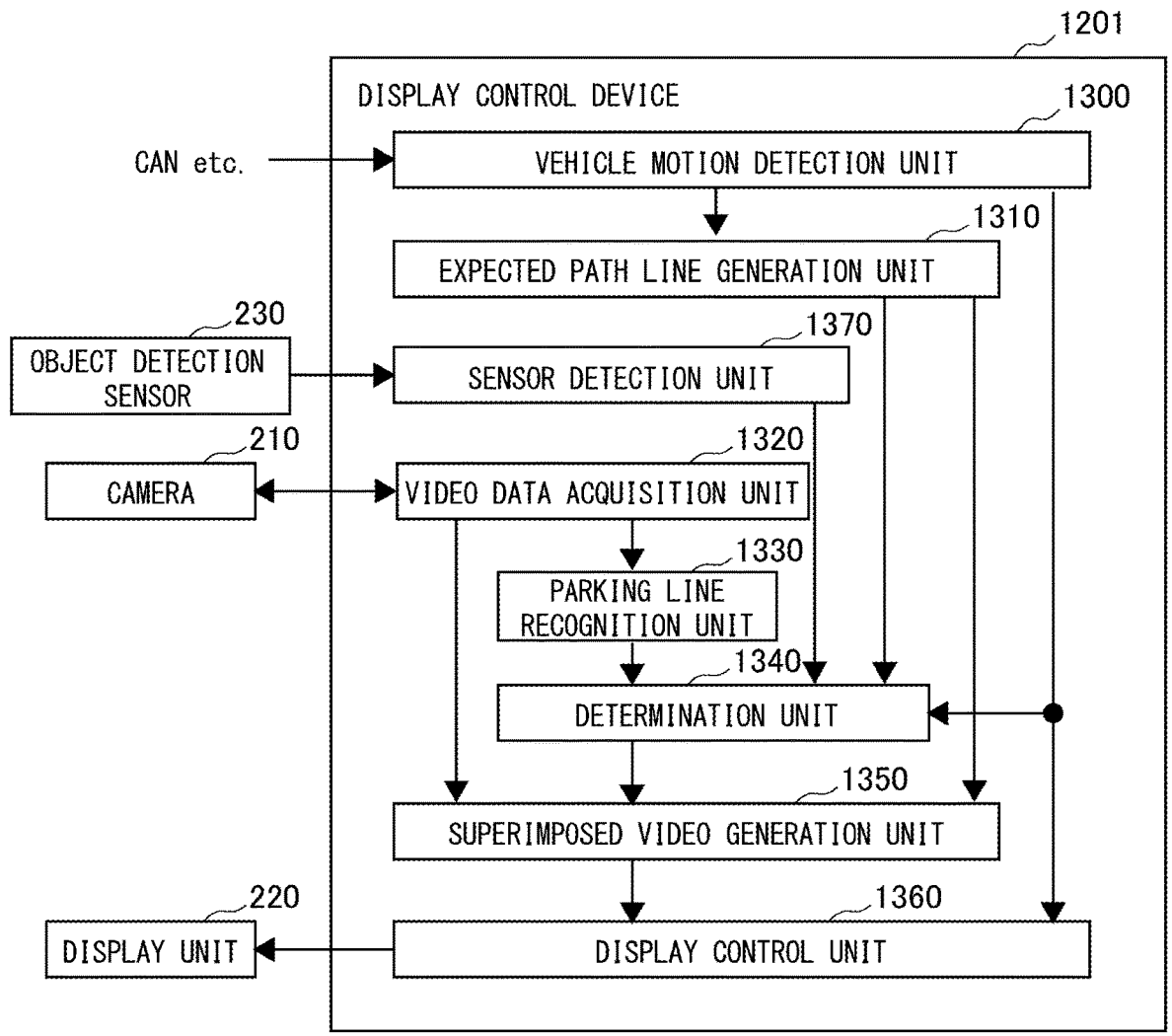
FIG. 15 is a functional block diagram of a display control system 1101 according to a seventh embodiment.

The functional configuration of a display control system 1101 is described hereinafter with reference to FIG. 15. FIG. 15 is a functional block diagram of the display control system 1101 according to the seventh embodiment. The display control system 1101 according to the seventh embodiment is different from the display control system 1100 according to the fifth embodiment in that it has an object detection sensor 230 and a sensor detection unit 1370. Further, it is different from the display control system 1100 according to the fifth embodiment in the function of the determination unit 1340.

The display control system 1101 is a system that, when a driver is moving a vehicle to a parking space, superimposes an expected path line indicating a planned moving direction on a video image captured by a camera 210 that is mounted on the front or back of the vehicle and takes a video of a vehicle moving direction, and displays this video image on a display unit 220. In addition, the display control system 1101 includes the object detection sensor 230, and further includes a display control device 1201 and at least one of the camera 210 and the display unit 220.

The object detection sensor 230 is a sensor that detects a distance of an object existing around a vehicle from the vehicle. The object detection sensor 230 is an ultrasonic sensor, an infrared sensor, a laser sensor, a millimeter-wave radar or the like, for example. The object detection sensor 230 may be a stereo camera. Further, a plurality of object detection sensors 230 may be placed. The object detection sensor 230 may be composed of a combination of them. The object detection sensor 230 is connected to the sensor detection unit 1370 in the display control device 201.

The display control device 1201 is described hereinafter. The display control device 1201 is different from the display control device 1200 according to the fifth embodiment in that it includes the sensor detection unit 1370 and a determination unit 1340 which is connected to the sensor detection unit 1370, instead of the determination unit 1340.

The sensor detection unit 1370 detects information transmitted from the object detection sensor 230. The sensor detection unit 1370 transmits the detected information to the determination unit 1340. The sensor detection unit 1370 can combine information transmitted from a plurality of object detection sensors 230 and transmit the composite information to the determination unit 1340, for example. Alternatively, the sensor detection unit 1370 may transmit information transmitted from a plurality of object detection sensors 230 to the determination unit 1340 without combining them, for example. Alternatively, the sensor detection unit 1370 may extract only predetermined information from information transmitted from a plurality of object detection sensors 230 and transmit this information to the determination unit 1340, for example. The predetermined information may be information as to whether an object exists within a predetermined distance from a vehicle, for example. Further, the predetermined information may be distance information from a vehicle to an object, for example.

The determination unit 1340 receives information transmitted from the vehicle motion detection unit 1300, information transmitted from the expected path line generation unit 1310, information transmitted from the parking line recognition unit 1330, or information transmitted from the sensor detection unit 1370, and determines a display form of the expected path line to be displayed on the display unit 220. The determination unit 1340 transmits information about this determination to the superimposed video generation unit 1350.

The determination unit 1340 can determine a display form of the expected path line based on the information transmitted from the vehicle motion detection unit 1300 and the sensor detection unit 1370, for example. Further, the determination unit 1340 can calculate the distance between the parking space and the expected path line from the information about the expected path line transmitted from the expected path line generation unit 1310 and the information about the parking line transmitted from the parking line recognition unit 1330, for example. Then, the determination unit 1340 can determine the display form of the expected path line based on the calculation result and the information transmitted from the sensor detection unit 1370.

Figure 16:
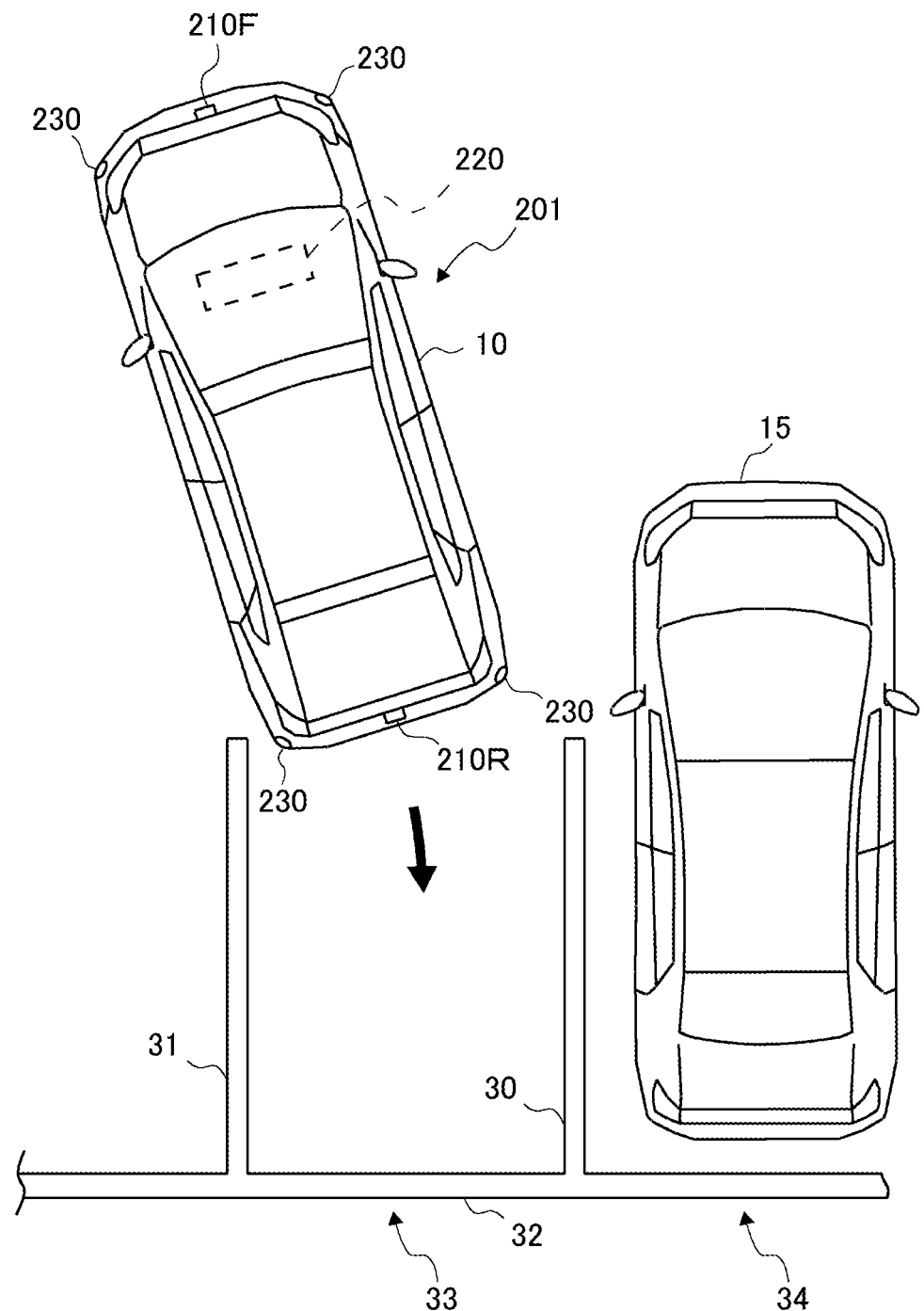
FIG. 16 is a top view showing an example of a state where a vehicle 10 on which the display control system 1101 according to the seventh embodiment is mounted is moving to a parking space.

A vehicle on which the display control system 1101 is mounted is described hereinafter with reference to FIG. 16. FIG. 16 is a top view showing an example of a state where a vehicle 10 on which the display control system 1101 is mounted is moving to a parking space 33. The vehicle 10 includes the display control device 1201 at an arbitrary position. The vehicle 10 also includes a forward camera 210F and a rearward camera 210R. The vehicle 10 further includes the display unit 220 at a position that can be viewed by a driver while handling the vehicle. In addition, the vehicle 10 includes the object detection sensor 230 for detecting the presence or absence of an object around the vehicle 10. In FIG. 16, the vehicle 10 is moving backward toward the parking space 33. The parking space 33 includes parking lines 30 to 32. The driver is trying to move the vehicle 10 to a position surrounded by the parking lines 30 to 32. In this case, the display control system 1101 acquires data of a video captured by the rearward camera 210R. Further, another vehicle 15 exists in a parking space 34 adjacent to the parking space 33. Thus, the driver of the vehicle 10 moves the vehicle 10 to the parking space 33 with a distance kept between the vehicle 10 and another vehicle 15.

The display control system 1101 according to the seventh embodiment is further described with reference to FIG. 17. FIG. 17 is a view showing an example of a video image in the display control system 101 according to the seventh embodiment.

Figure 17A:
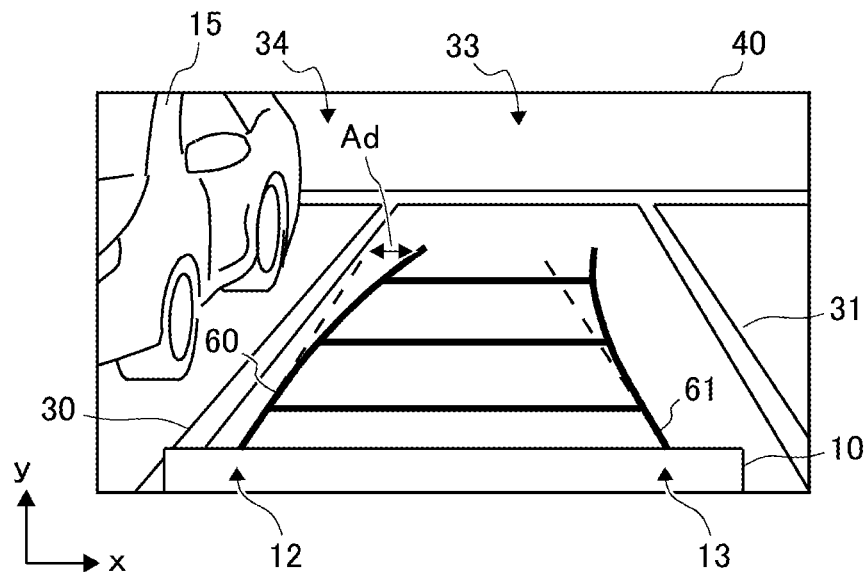
FIG. 17A is a view showing an example of a video image in a display control system 1101 according to the seventh embodiment.

FIG. 17A is a view showing an example of a video image where a seventh expected path line is superimposed on video data in the display control system 1101 according to the third embodiment. In FIG. 17A, the vehicle 10 is moving toward the parking space 33. The steering angle Ad is smaller than a predetermined angle. The vehicle 10 is moving with the steering angle close to a straight line motion. Thus, the third expected path line 60 and 61 and the parking line 30 and 31 displayed along the moving direction of the vehicle 10 are likely to be displayed in parallel. In this case, the parking line 30 and 31 and the third expected path line 60 and 61 are likely to be displayed in close proximity to each other.

However, another vehicle 15 is parked in the parking space 34 adjacent to the parking space 33. In such a case, a driver needs to move the vehicle 10 to the parking space 33 with a distance kept from another vehicle 15. Thus, the determination unit 1340 determines to set the display form (second display mode) that superimposes the third expected path lines 60 and 61 regardless of the value of the steering angle Ad when it detects a nearby object at a predetermined distance from the vehicle 10.

Figure 17B:
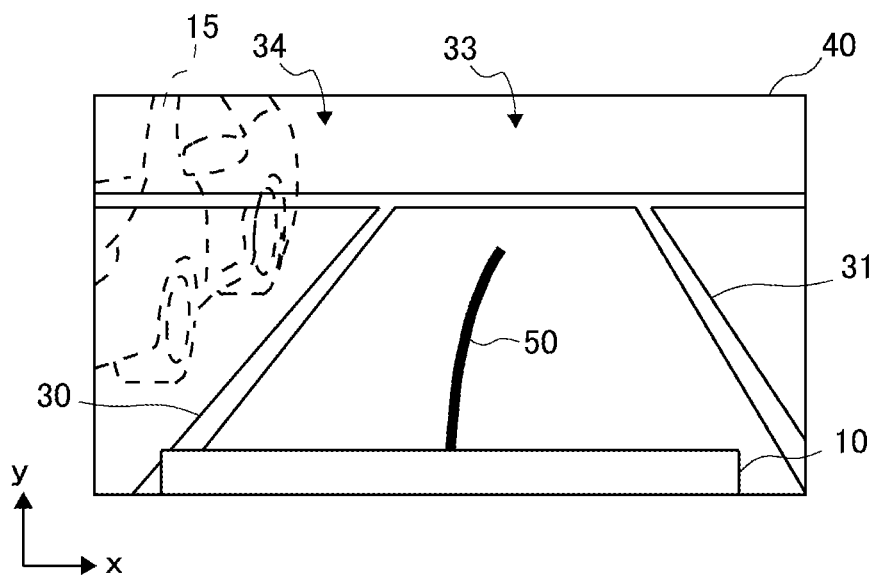
FIG. 17B is a view showing an example of a video image in the display control system 1101 according to the seventh embodiment.

FIG. 17B is a view showing an example of a video image where a first expected path line is superimposed on video data in the display control system 1101 according to the seventh embodiment. In FIG. 17B, another vehicle 15 is not parked in the parking space 34. Thus, the determination unit 1340 determines a display form depending on whether the steering angle Ad is smaller than a predetermined angle when it does not detect a nearby object at a predetermined distance from the vehicle 10. Specifically, the determination unit 1340 determines to set the display form (first display mode) that superimposes the first expected path line when the steering angle Ad is smaller than a predetermined angle.

In this configuration, the display control system 1101 according to the seventh embodiment can reduce difficulty of visually recognizing a parking line with a distance kept from a nearby object when a driver moves a vehicle to a parking space.

Figure 18:
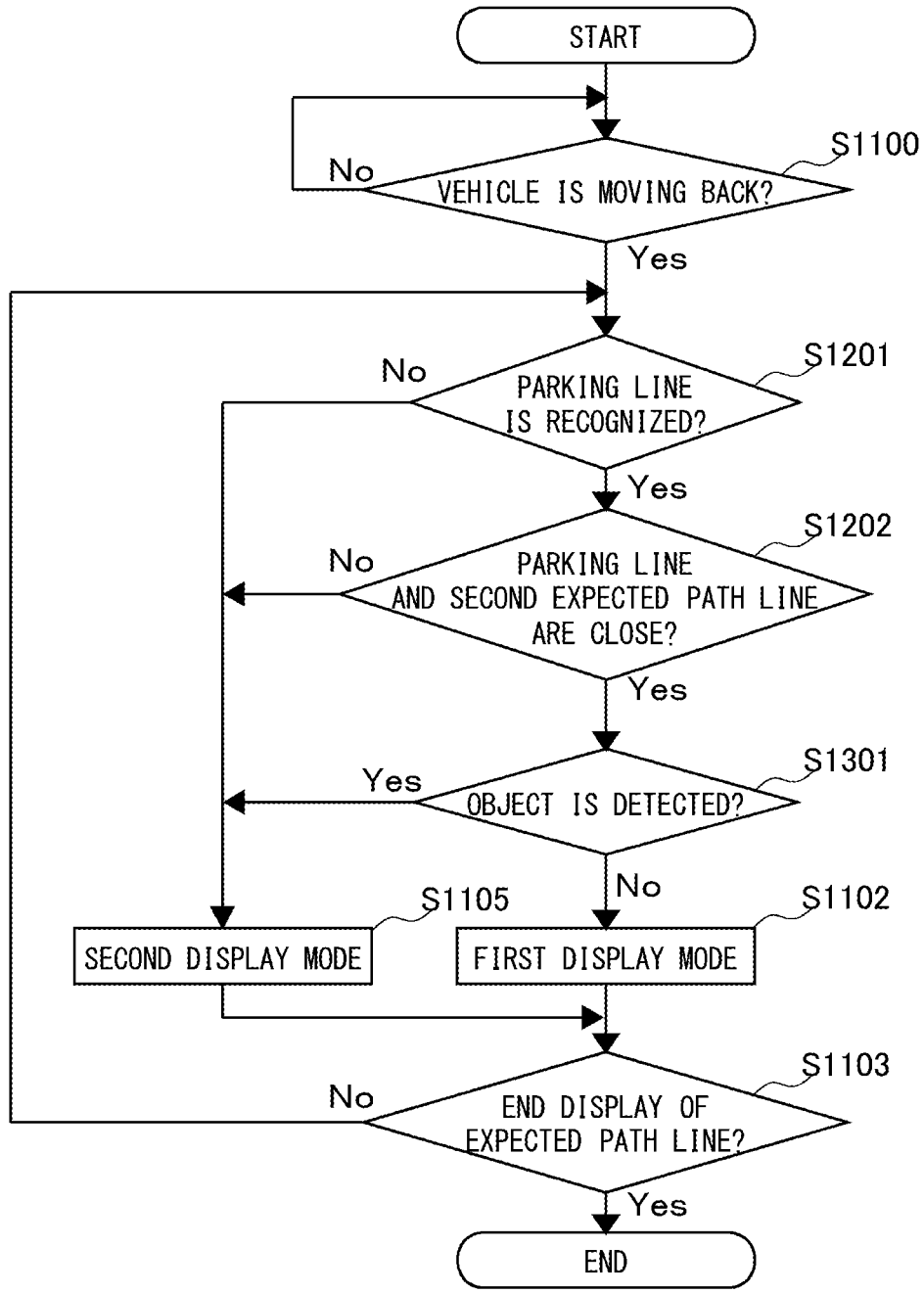
FIG. 18 is a view showing a flowchart in a display control device 1201 according to the seventh embodiment.

A process of the display control device 1201 according to the seventh embodiment is described hereinafter with reference to FIG. 18. FIG. 18 is a view showing a flowchart in the display control device 1201 according to the seventh embodiment. The flowchart of the display control device 1201 according to the seventh embodiment is different from the flowchart of the display control device 1200 according to the sixth embodiment in processing between Step S1202 and Step S1102.

When the determination unit 1340 determines that the parking line and the third expected path line are close to each other in Step S1202 (Yes in Step S1202), the determination unit 1340 determines whether a nearby object around the vehicle 10 exists or not (Step S1301). Specifically, the determination unit 1340 determines whether a nearby object around the vehicle 10 exists or not from the information transmitted from the sensor detection unit 1370.

When the determination unit 1340 determines that a nearby object around the vehicle 10 exists (Yes in Step S1301), the determination unit 1340 transmits information indicating generation of superimposed data in the second display mode to the superimposed video generation unit 1350 (Step S1105).

On the other hand, when the determination unit 1340 does not determine that a nearby object around the vehicle 10 exists (No in Step S1301), the determination unit 1340 transmits information indicating generation of superimposed data in the first display mode to the superimposed video generation unit 1350 (Step S1102).

The subsequent process is the same as the process according to the first and second embodiments described above. Note that, in the process according to the seventh embodiment, Step 1301 may be performed before Step 1201 or before Step S1202.

The display control system 1101 according to the seventh embodiment uses the steering angle Ad in the determination as to whether the parking line and the third expected path line are close to each other. However, the values of the distances D62 to D65 described in the sixth embodiment may be used in the determination as to whether the parking line and the third expected path line are close to each other.

By performing the above process, the display control system 1101 according to the seventh embodiment can reduce difficulty of visually recognizing the parking line displayed on the display unit.

Eighth Embodiment

An eighth embodiment is described hereinafter with reference to FIGS. 19 and 20. A display control system 1101 according the eighth embodiment is the same as the functional block diagram described with reference to FIG. 15. The display control system 1101 according the eighth embodiment is different from the display control system 1101 according to the seventh embodiment in that the determination unit 1340 calculates a distance between a parking line and a nearby object from information transmitted from the parking line recognition unit 1330 and information transmitted from the sensor detection unit 1370.

The eighth embodiment is described hereinafter in detail with reference to FIG. 19. FIG. 19 is a view showing an example of a video image in the display control system 1101 according to the eighth embodiment.

Figure 19A:
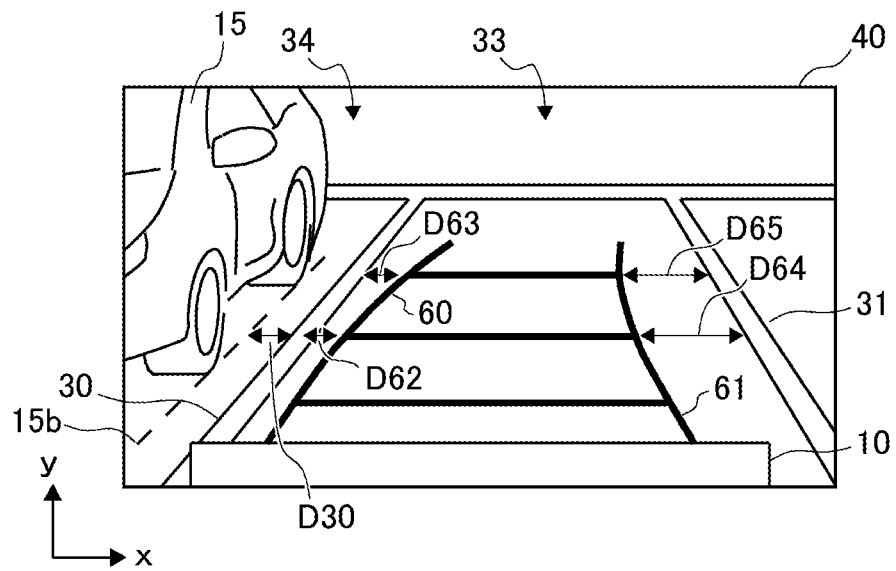
FIG. 19A is a view showing an example of a video image in a display control system 1101 according to an eighth embodiment.
Figure 20:
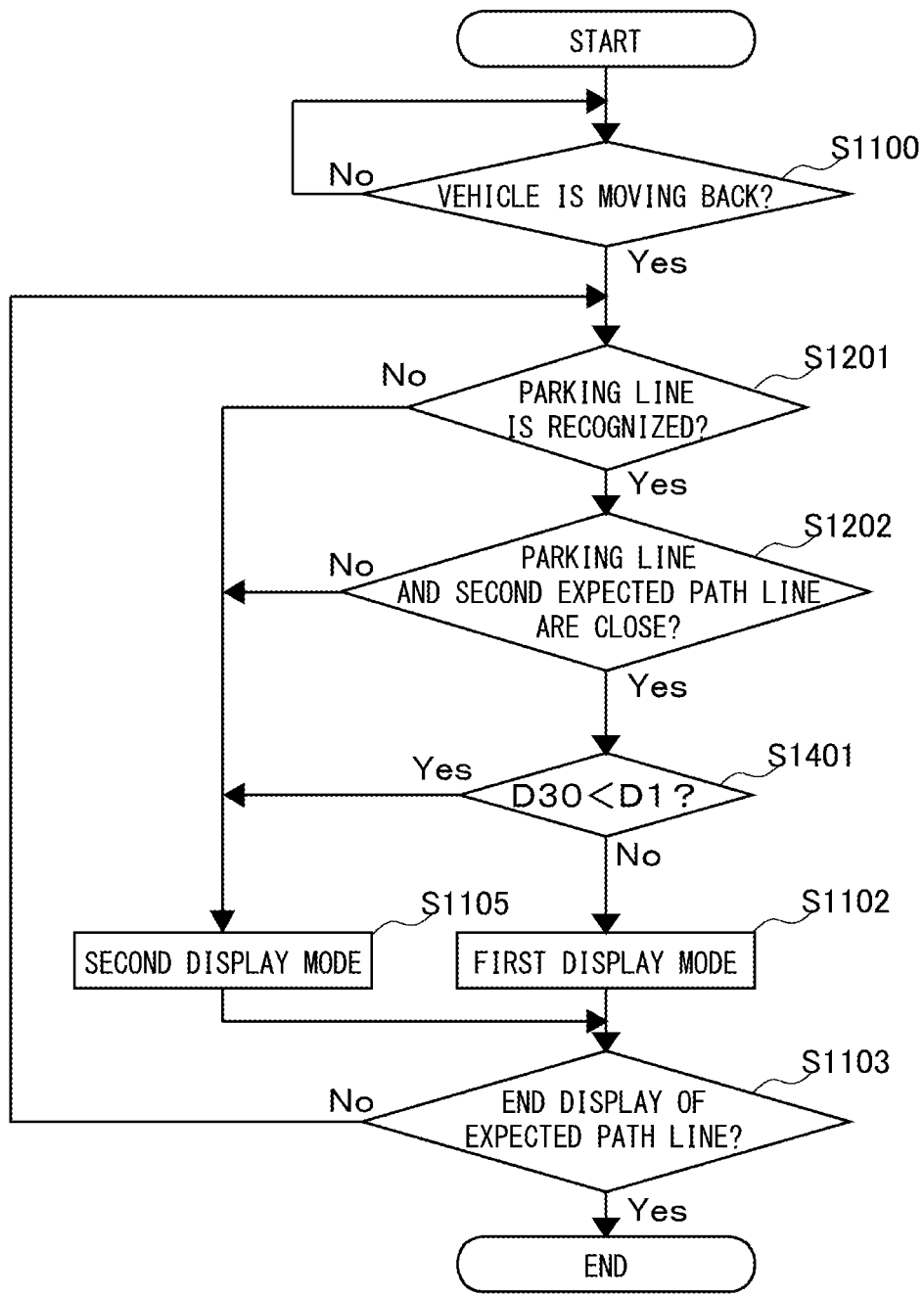
FIG. 20 is a view showing a flowchart in a display control device 1201 according to the eighth embodiment.

FIG. 19A is a view showing an example of a video image where a third expected path line is superimposed on video data in the display control system 1101 according to the eighth embodiment. In FIG. 19A, the vehicle 10 is moving toward the parking space 33.

The determination unit 1340 calculates the distance between the left parking line 30 and the left third expected path line 60 in the video image 40 in order to determine whether the parking line and the third expected path line are close to each other or not. Likewise, the determination unit 1340 calculates the distance between the right parking line 31 and the right third expected path line 61 in the video image 40. Specifically, the determination unit 1340 calculates each of the distances D62 to D65.

In FIG. 19A, the distance D62 and the distance D63 are within a predetermined range. Stated differently, the parking line 30 and the third expected path line 60 are in close proximity to each other. In such cases, it is difficult for a driver to find out the parking line 30 in the video image 40. Thus, there are cases where it is difficult for the driver to grasp the positional relationship between the vehicle and the parking space. When the distance between the third expected path line 60 and 61 and the parking line 30 and 31 is within a predetermined range, the determination unit 1340 determines that the parking line 30 and 31 and the third expected path line 60 and 61 are displayed in close proximity to each other.

However, another vehicle 15 is parked in the parking space 34 adjacent to the parking space 33. In such a case, a driver needs to move the vehicle 10 to the parking space 33 with a distance kept from another vehicle 15. Thus, the determination unit 1340 determines to set the display form (second display mode) that superimposes the third expected path lines 60 and 61 regardless of the value of the distances D62 to D65 when it detects a nearby object at a predetermined distance from the parking line 30 or 31. In FIG. 19A, a distance D30 is the distance between the parking line 30 and another vehicle 15. The determination unit 1340 calculates the distance D30 from information about the position and distance of another vehicle 15 detected by the object detection sensor 230 and information about the parking line 30 recognized by the parking line recognition unit 1330.

When calculating the distance D30, the determination unit 1340 can analyze the position and distance of another vehicle 15 and set a border line of the detected object as indicated by a dashed line 15b. The distance D30 may be the distance between the parking line 30 and another vehicle 15 in the horizontal direction, for example. Further, the distance D30 may be the shortest distance between the parking line 30 and another vehicle 15.

Figure 19B:
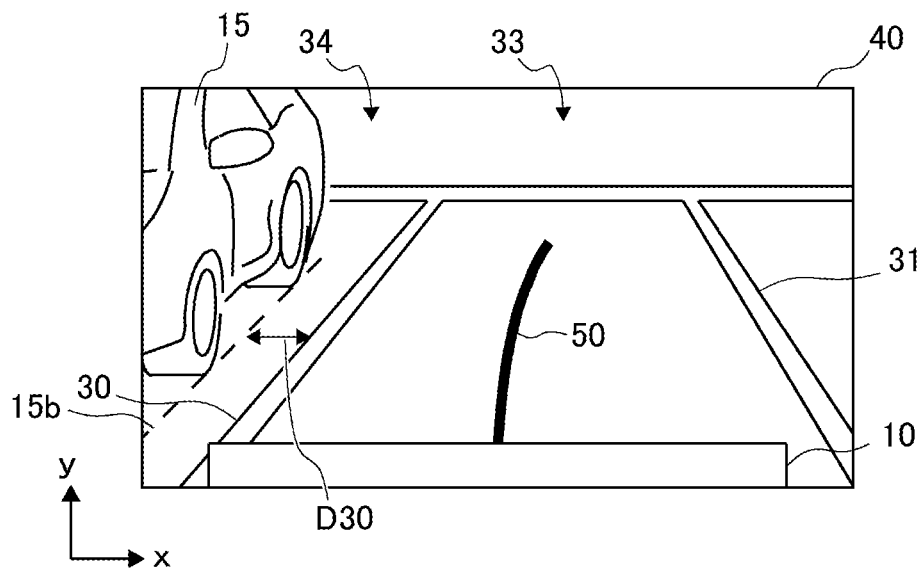
FIG. 19B is a view showing an example of a video image in the display control system 1101 according to the eighth embodiment.

FIG. 19B is a view showing an example of a video image where a first expected path line is superimposed on video data in the display control system 1101 according to the eighth embodiment. In FIG. 19B, the distance D30 between another vehicle 15 parked in the parking space 34 and the parking line 30 is larger than a predetermined value. In this case, the determination unit 1340 determines that the parking line 30 and 31 and the third expected path line 60 and 61 are displayed in close proximity to each other when the distance between the third expected path line 60 and 61 and the parking line 30 and 31 is within a predetermined range.

In other words, the determination unit 1340 determines to set the display form (first display mode) that superimposes the first expected path line.

In this configuration, the display control system 1101 according to the eighth embodiment can reduce difficulty of visually recognizing a parking line with a distance kept from a nearby object when a driver moves a vehicle to a parking space.

A process of the display control device 1201 according to the eighth embodiment is described hereinafter with reference to FIG. 20. FIG. 20 is a view showing a flowchart in the display control device 1201 according to the eighth embodiment. The flowchart of the display control device 1201 according to the eighth embodiment is different from the flowchart of the display control device 1201 according to the seventh embodiment in processing between Step S1202 and Step S1102.

When the determination unit 1340 determines that the parking line and the third expected path line are close to each other in Step S1202 (Yes in Step S1202), the determination unit 1340 determines whether the parking line 30 and 31 and a nearby object around the vehicle 10 are close to each other or not (Step S1401). Specifically, the determination unit 1340 calculates the distance D30 from information transmitted from the sensor detection unit 1370 and information transmitted from the parking line recognition unit 1330. Then, the determination unit 1340 determines whether the distance D30 is smaller than a predetermined distance D1 or not.

When the determination unit 1340 determines that the distance D30 is smaller than the distance D1 (Yes in Step S1401), the determination unit 1340 transmits information indicating generation of superimposed data in the second display mode to the superimposed video generation unit 1350 (Step S1105).

On the other hand, when the determination unit 1340 does not determine that the distance D30 is smaller than the distance D1 (No in Step S1401), the determination unit 1340 transmits information indicating generation of superimposed data in the first display mode to the superimposed video generation unit 1350 (Step S1102).

The subsequent process is the same as the process according to the fifth to seventh embodiments described above. Note that, in the process according to the eighth embodiment, Step 1401 may be performed before Step 1201 or before Step S1202.

The display control system 1101 according to the eighth embodiment uses the distances D62 to D65 in the determination as to whether the parking line and the third expected path line are close to each other. However, the value of the steering angle Ad described in the fifth embodiment may be used in the determination as to whether the parking line and the third expected path line are close to each other.

By performing the above process, the display control system 1101 according to the eighth embodiment can reduce difficulty of visually recognizing a parking line displayed on a display unit.

Examples of Other Display Forms in First Display Mode

Examples of other display forms in the first display mode according to the fifth to eighth embodiments are described hereinafter with reference to FIGS. 21 to 23.

Figure 21:
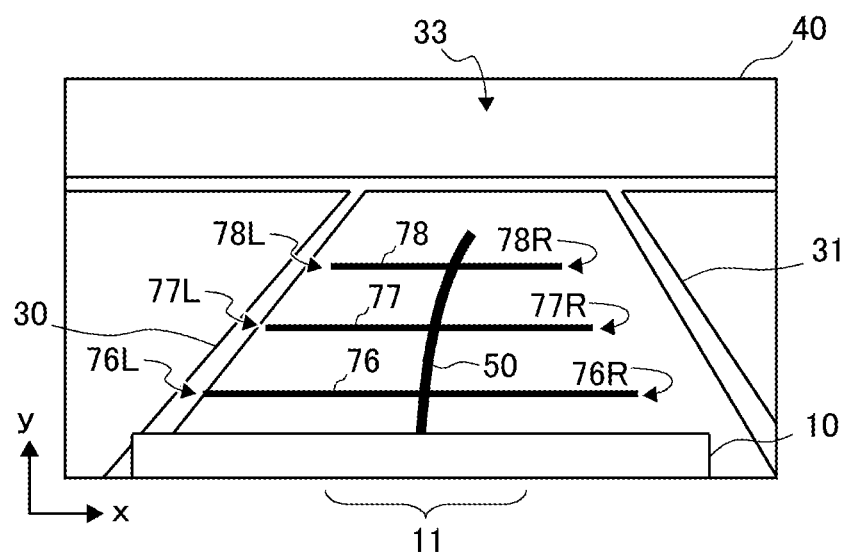
FIG. 21 is a view showing an example of a video image where a first expected path line and a vehicle width guide line are superimposed on video data.

FIG. 21 is a view showing an example of a video image where a first expected path line and vehicle width guide lines are superimposed on video data. In the video image 40 shown in FIG. 21, vehicle width guide lines 76 to 78 are superimposed on the first expected path line 50 described with reference to FIG. 10. The vehicle width guide lines 76 to 78 are line information extending in the horizontal direction of the video image 40, which is the direction parallel to the x-axis. The vehicle width guide lines 76 to 78 may indicate a predetermined distance from the end of the vehicle 10. The vehicle width guide line 76 may indicate a distance of 0.4 meter from the rear end of the vehicle 10, for example. The vehicle width guide line 77 may indicate a distance of 1.0 meter from the rear end of the vehicle 10, for example. The vehicle width guide line 78 may indicate a distance of 2.0 meters from the rear end of the vehicle 10, for example. In this case, the vehicle width guide lines 76 to 78 may be lines that are not displaced in the y-axis direction in the video image 40. The vehicle width guide lines 76 to 78 may be the same as the distance indicator lines 166 to 168 described with reference to FIG. 11.

The length of the vehicle width guide lines 76 to 78 coincide with the width of the vehicle 10. For example, a left end 76L of the vehicle width guide line 76 indicates one end along the width of the vehicle 10 at a distance of 0.4 meter from the rear end of the vehicle 10. On the other hand, a right end 76R of the vehicle width guide line 76 indicates the other end along the width of the vehicle 10 at a distance of 0.4 meter from the rear end of the vehicle 10. Thus, the vehicle width guide line 76 is a straight line that extends along the width of the vehicle 10 and coincides with the width of the vehicle 10 at a distance of 0.4 meter from the rear end of the vehicle 10. Likewise, the vehicle width guide line 77 is a straight line that extends along the width of the vehicle 10 and coincides with the width of the vehicle 10 at a distance of 1.0 meter from the rear end of the vehicle 10. Further, the vehicle width guide line 78 is a straight line that extends along the width of the vehicle 10 and coincides with the width of the vehicle 10 at a distance of 2.0 meters from the rear end of the vehicle 10. The vehicle width guide lines 76 to 78 can be displaced in the x-axis direction in the video image 40 in accordance with the steering angle of the vehicle 10.

Figure 22A:
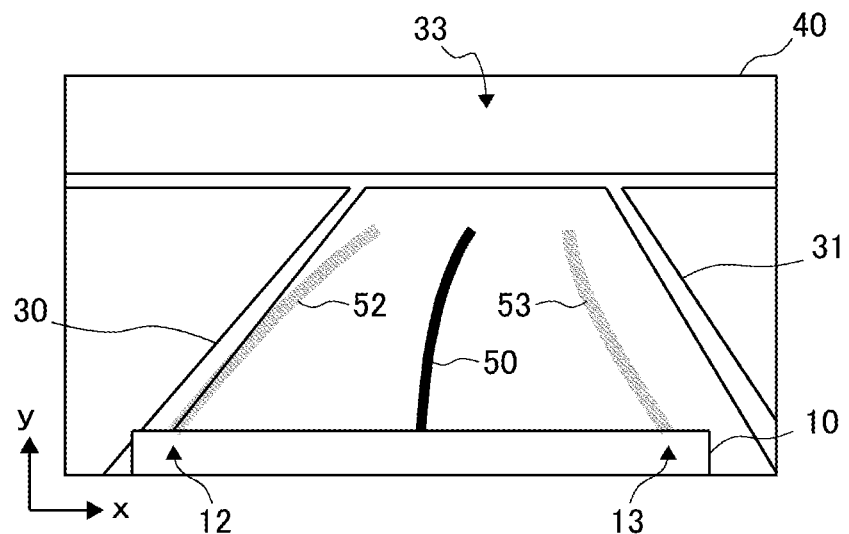
FIG. 22A is a view showing an example of a video image where a first expected path line and a second expected path line with high transparency are superimposed on video data.

An example of another display form in the first display mode is further described hereinafter with reference to FIG. 22. FIG. 22 is a view showing an example of a video image where a first expected path line and a second expected path line with high transparency are superimposed on video data. In the video image 40 shown in FIG. 22A, second expected path lines 52 and 53 are superimposed in addition to the first expected path line 50 described with reference to FIG. 4.

The second expected path lines 52 and 53 are a pair of line information associated with the steering angle of the vehicle 10. The second expected path lines 52 and 53 are line information indicating an expected driving path of the vehicle 10 in accordance with the steering angle of the vehicle 10. The second expected path line 52 extends along a planned moving path in accordance with the steering angle from a left end 12 along the width of the vehicle 10. Likewise, the second expected path line 53 extends along a planned moving path in accordance with the steering angle from a right end 13 along the width of the vehicle 10. Thus, the second expected path lines 52 and 53 extend in the moving direction of the vehicle 10 from the positions corresponding to the width of the vehicle 10. The second expected path lines 52 and 53 are curved lines in accordance with the steering angle of the vehicle 10 except when the vehicle 10 is moving in a straight line. The curvature of the second expected path lines 52 and 53 is larger as the steering angle of the vehicle 10 is larger.

In the example shown in FIG. 22A, the second expected path lines 52 and 53 have predetermined transparency. The predetermined transparency is 50% to 90%, for example. In a part where the second expected path lines 52 and 53 overlap the video data in the superimposed data generated by the superimposed video generation unit 1350, the second expected path lines 52 and 53 are semi-transparent.

Further, the second expected path lines 52 and 53 have higher transparency than that of the first expected path line 50. For example, when the transparency of the second expected path lines 52 and 53 is 50%, the transparency of the first expected path line 50 is 0%. A difference between the transparency of the second expected path lines 52 and 53 and the transparency of the first expected path line 50 is preferably 50% or more.

In this configuration, the possibility that the parking line and the first expected path line overlap is reduced. Further, the display control device 1200 or the display control device 1201 superimposes the second expected path lines 52 and 53 and can thereby reduce difficulty of visually recognizing the parking line displayed on the display unit and also accurately display the positional relationship between the width of the vehicle 10 and the parking space.

Figure 22B:
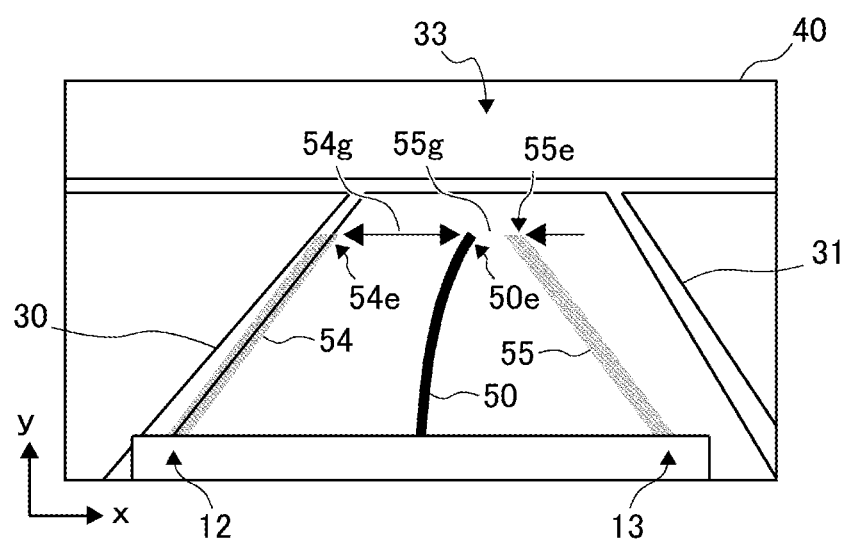
FIG. 22B is a view showing an example of a video image where a first expected path line and a second expected path line with high transparency are superimposed on video data.

FIG. 22B is described hereinafter. In the video image 40 shown in FIG. 22B second expected path lines 54 and 55 are superimposed on the first expected path line 50.

The second expected path lines 54 and 55 are a pair of line information corresponding to the width of the vehicle 10 and extending from the ends along the width of the vehicle 10 when the vehicle 10 moves in a straight line. The second expected path line 54 extends in the straight moving direction of the vehicle 10 from a left end 12 along the width of the vehicle 10. Likewise, the second expected path line 55 extends in the straight moving direction of the vehicle 10 from a right end 13 along the width of the vehicle 10. Thus, the second expected path lines 54 and 55 extend in the moving direction of the vehicle 10 from the positions corresponding to the width of the vehicle 10. The second expected path lines 54 and 55 do not vary depending on the steering angle of the vehicle 10. On the other hand, the first expected path line 50 varies depending on the steering angle. Therefore, a distance 54g between an end point 50e of the first expected path line 50 and an end point 54e of the second expected path line 54 varies depending on the steering angle of the vehicle 10. Specifically, the distance 54g is longer as the steering angle of the vehicle 10 is large to the right. Likewise, a distance 55g between the end point 50e of the first expected path line 50 and an end point 55e of the second expected path line 55 is longer as the steering angle of the vehicle 10 is large to the left.

In this configuration, the possibility that the parking line and the first expected path line overlap is reduced. Further, the display control device 1200 according to the eighth embodiment superimposes the second expected path lines 54 and 55 and can thereby reduce difficulty of visually recognizing the parking line displayed on the display unit and also accurately display the positional relationship between the width of the vehicle 10 and the parking space and the information about the steering angle.

An example of another display form in the first display mode is further described hereinafter with reference to FIG. 23. FIG. 23 is a view showing a video image illustrating a variation of the first expected path line.

Figure 23:
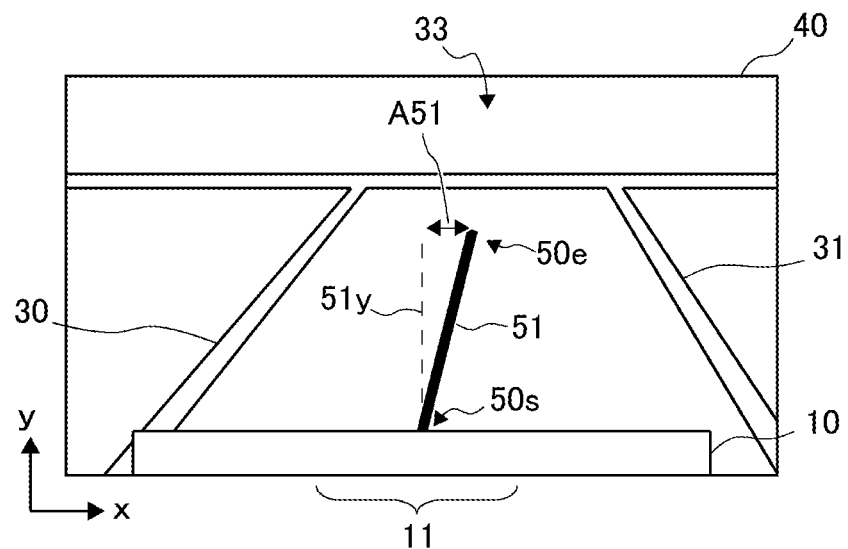
FIG. 23 is a view showing a video image illustrating a variation of a first expected path line.
Figure 24:
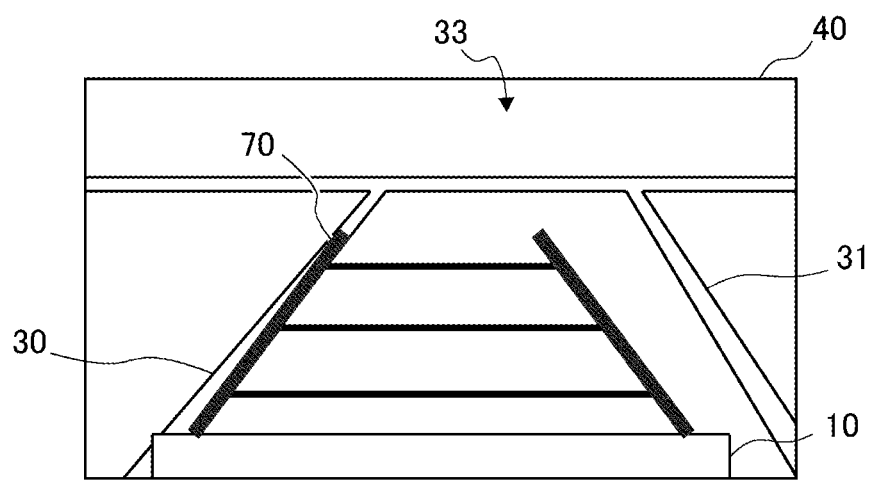
FIG. 24 is a view showing an example of a rearward video image in a related art.

A first expected path line 51 superimposed on the video image 40 shown in FIG. 23 is a straight line. The first expected path line 51 extends linearly along a planned moving path in accordance with the steering angle from a start point 50s coinciding with the center part 11 of the vehicle 10. Thus, the main expected path line 51 connects the start point 50s and an end point 50e by a straight line.

The first expected path line 51 draws a straight line 51y parallel to the y-axis when the vehicle 10 is moving in a straight line. An angle A51 between the first expected path line 51 and the straight line 51y is larger as the steering angle of the vehicle 10 is larger.

The start point 50s is contained in the center part 11 of the vehicle 10. The end point 50e is a point on a curved line extending from the start point 50s along the planned moving path in accordance with the steering angle of the vehicle 10.

In the examples of other display forms in the first display mode described above also, the possibility that the parking line and the first expected path line 50 or 51 overlap is reduced when the driver moves the vehicle to the parking space. Further, the first expected path line 50 or 51 is displayed in such a way that they can be accurately visually recognized by a driver. The display control system 1100 and 1101 according to the fifth to eighth embodiments with such display forms can thereby reduce difficulty of visually recognizing the parking line displayed on the display unit.

It should be noted that the above-described embodiments may be applied to the case where the vehicle 10 moves forward to the parking space 33. In this case, the display control device 1200 can superimpose the expected path line on data of a video captured by the forward camera 210F of the vehicle 10. In this case, in Step S1100, the display control device 1200 can detect that the vehicle 10 is moving forward at a speed slower than a predetermined traveling speed, for example. Alternatively, in Step S1100, the display control device 1200 may start the first display mode in response to an instruction from a driver, which is not shown.

While the present invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

A display control device or the like according to this embodiment can be used to superimpose predetermined information on a video image around a vehicle in motion and display this video image, for example.

What is claimed is:

1. A display control device comprising:
   a video data acquisition unit configured to acquire video data from a camera that captures a video image in a moving direction of a vehicle;
   a vehicle motion detection unit configured to detect motion information containing a steering angle of the vehicle;
   an expected path line generation unit configured to generate a first expected path line extending along a planned moving path in accordance with the steering angle from a center part along a width of the vehicle and a third expected path line including a pair of lines extending along a planned moving path of the vehicle from both ends of the vehicle in the width direction;
   a parking line recognition unit configured to recognize a parking line from the video data;
   a detection unit configured to detect a nearby object around the vehicle;
   a determination unit configured to determine to superimpose the first expected path line on the video data when a distance between the nearby object detected by the detection unit and the parking line is larger than a predetermined value, and the parking line and the third expected path line are to be displayed in close proximity to each other;

a superimposed video generation unit configured to generate superimposed data, the superimposed data being video data where the first expected path line or the third expected path line is superimposed on the video data in accordance with a determination by the determination unit; and a display control unit configured to transmit the superimposed data to a display unit so as to display a video related to the superimposed data on the display unit.

2. The display control device according to claim 1, wherein the first expected path line generated by the expected path line generation unit is displayed on the display unit as a straight line extending from the center part along the width of the vehicle.

3. The display control device according to claim 2, wherein the expected path line generation unit further generates a pair of second expected path lines extending along a planned moving path of the vehicle from both ends of the vehicle in the width direction and having higher transparency than that of the first expected path line on the video data.

4. The display control device according to claim 3, wherein the second expected path line generated by the expected path line generation unit is displayed as a straight line extending in a straight moving direction of the vehicle from both ends of the vehicle in the width direction.

5. The display control device according to claim 1, wherein the determination unit determines to superimpose the first expected path line on the video data when the parking line and the third expected path line are to be displayed in close proximity to each other.

6. The display control device according to claim 5, wherein, when the determination unit determines to superimpose the first expected path line on the video data, the superimposed video generation unit generates superimposed data, the superimposed data being video data where a second expected path line having higher transparency than that of the first expected path line is additionally superimposed.

7. The display control device according to claim 6, wherein the second expected path line includes a pair of lines extending in a straight moving direction of the vehicle.

8. The display control device according to claim 1, wherein the determination unit determines that the parking line and the third expected path line are to be displayed in close proximity to each other when the steering angle of the vehicle is smaller than a predetermined angle.

9. The display control device according to claim 1, further comprising:
a parking line recognition unit configured to recognize a parking line from the video data,
wherein the determination unit determines that the parking line and the third expected path line are to be displayed in close proximity to each other when a distance between the third expected path line and the parking line is within a predetermined range.

10. The display control device according to claim 1, wherein the expected path line generation unit further generates a vehicle width guide line, the line being a line extending along the width of the vehicle and coinciding with the width of the vehicle in the moving direction.

11. A display control system comprising:
the display control device according to claim 1; and
at least one of a camera configured to capture the video data and a display unit configured to display the video data.

12. A display control method comprising:
acquiring video data from a camera that captures a video image in a moving direction of a vehicle;
detecting motion information containing a steering angle of the vehicle;
generating a first expected path line extending along a planned moving path in accordance with the steering angle from a center part along a width of the vehicle and a third expected path line including a pair of lines extending along a planned moving path of the vehicle from both ends of the vehicle in the width direction;
recognizing a parking line from the video data;
detecting a nearby object around the vehicle;
determining to superimpose the first expected path line on the video data when a distance between the nearby object detected by the detection unit and the parking line is larger than a predetermined value, and the parking line and the third expected path line are to be displayed in close proximity to each other;
generating superimposed data, the superimposed data being video data where the first expected path line or the third expected path line is superimposed on the video data in accordance with a determination; and
transmitting the superimposed data to a display unit so as to display a video related to the superimposed data on the display unit.

13. A computer readable non-transitory storage medium storing a display control program causing a computer to execute:
acquiring video data from a camera that captures a video image in a moving direction of a vehicle;
detecting motion information containing a steering angle of the vehicle;
generating a first expected path line extending along a planned moving path in accordance with the steering angle from a center part along a width of the vehicle and a third expected path line including a pair of lines extending along a planned moving path of the vehicle from both ends of the vehicle in the width direction;
recognizing a parking line from the video data;
detecting a nearby object around the vehicle;
determining to superimpose the first expected path line on the video data when a distance between the nearby object detected by the detection unit and the parking line is larger than a predetermined value, and the parking line and the third expected path line are to be displayed in close proximity to each other;
generating superimposed data, the superimposed data being video data where the first expected path line or the third expected path line is superimposed on the video data in accordance with a determination; and
transmitting the superimposed data to a display unit so as to display a video related to the superimposed data on the display unit.

* * * * *